US012745119B2

(12) United States Patent
Jeong et al.

(10) Patent No.: US 12,745,119 B2
(45) Date of Patent: Sep. 22, 2026

(54) METHOD AND DEVICE FOR MANAGING QOE OF TERMINAL IN WIRELESS COMMUNICATION SYSTEM

(71) Applicant: Samsung Electronics Co., Ltd., Suwon-si (KR)

(72) Inventors: Seungbeom Jeong, Suwon-si (KR); Himke Van Der Velde, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 18/285,029

(22) PCT Filed: Apr. 1, 2022

(86) PCT No.: PCT/KR2022/004752

§ 371 (c)(1),
(2) Date: Sep. 29, 2023

(87) PCT Pub. No.: WO2022/211597

PCT Pub. Date: Oct. 6, 2022

(65) Prior Publication Data

US 2024/0196248 A1 Jun. 13, 2024

(30) Foreign Application Priority Data

Apr. 1, 2021 (KR) ........................ 10-2021-0042957

(51) Int. Cl.
*H04W 8/22* (2009.01)
*H04W 24/08* (2009.01)
(Continued)

(52) U.S. Cl.
CPC ............. *H04W 24/10* (2013.01); *H04W 8/22* (2013.01); *H04W 24/08* (2013.01);
(Continued)

(58) Field of Classification Search
CPC .......... H04B 17/0082–3913; H04W 8/22–245; H04W 24/02–10; H04W 28/02–26;
(Continued)

(56) References Cited

U.S. PATENT DOCUMENTS

2018/0270688 A1 9/2018 Jung et al.
2019/0166398 A1 5/2019 Lee
(Continued)

FOREIGN PATENT DOCUMENTS

KR 10-1991387 B1 9/2019
WO 2018/142345 A1 8/2018

OTHER PUBLICATIONS

Qualcomm Incorporated; Handling of NR QoE reporting; 3GPP TSG-RAN WG2 Meeting #113-e; R2-2101339; Electronic; Jan. 25-Feb. 5, 2021; Jan. 15, 2021.
(Continued)

*Primary Examiner* — Timothy J Weidner
(74) *Attorney, Agent, or Firm* — Jefferson IP Law, LLP

(57) ABSTRACT

The present disclosure relates to a method and device that allow a user equipment (UE) to manage quality of experience (QoE) in a wireless communication system, and an operation method of the UE managing QoE in the wireless communication system may include establishing a radio resource control (RRC) connection with a base station, transmitting UE capability information to the base station, receiving, from the base station, logged QoE measurement configuration information generated based on the UE capability information, logging QoE measurement results based on the received logged QoE measurement configuration information, reporting availability of logged QoE data to the base station, receiving a QoE data retrieval request from the base station, and transmitting logged QoE measurement result data to the base station.

9 Claims, 12 Drawing Sheets

(51) Int. Cl.

| | |
|---|---|
| ***H04W 24/10*** | (2009.01) |
| ***H04W 72/231*** | (2023.01) |
| ***H04W 72/51*** | (2023.01) |
| ***H04W 76/20*** | (2018.01) |
| ***H04W 76/30*** | (2018.01) |
| ***H04W 84/02*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |

(52) U.S. Cl.
CPC ......... *H04W 72/231* (2023.01); *H04W 72/51* (2023.01); *H04W 76/20* (2018.02); *H04W 76/30* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ......... H04W 36/0005–385; H04W 72/02–569; H04W 76/10–50; H04W 80/02–12; H04W 84/02–16; H04W 88/02–12; H04W 92/02–04; H04W 92/10
See application file for complete search history.

(56) References Cited

U.S. PATENT DOCUMENTS

| | | | | |
|---|---|---|---|---|
| 2021/0120621 | A1* | 4/2021 | Kwong | H04W 24/10 |
| 2022/0217560 | A1* | 7/2022 | Kumar | H04W 24/10 |
| 2022/0417780 | A1* | 12/2022 | Liu | H04W 24/10 |

OTHER PUBLICATIONS

Nokia et al.; NR QMC procedural principles; 3GPP TSG-RAN WG2 Meeting #113 Electronic; R2-2100598; R2-2009436; Elbonia, Jan. 25-Feb. 5, 2021; Jan. 15, 2021.

3GPP; 3rd Generation Partnership Project; Technical Specification Group Radio Access Network; Study on NR QoE management and optimizations for diverse services (Release 17); 3GPP TR 38.890; V0.2.0; (Jan. 2021); Jan. 4, 2021; Valbonne, France.

International Search Report with Written Opinion and English translation dated Jul. 13, 2022; International Appln. No. PCT/KR2022/004752.

* cited by examiner 1f-45
UE APP
1f-05
UE AS
1f-15
NG-RAN
1f-25
CN
1f-20
OAM
1f-65
TCE/MCE
1f-10
Capability information
1f-30
Configure QoE measurement
QoE measurement confgiuration
1f-35
Activate QoE measurement
QoE measurement confgiuration
1f-40
RRC Message
QoE measurement confgiuration
1f-50
AT Command
QoE measurement confgiuration
1f-55
AT Command
QoE report
1f-60
RRC Message
QoE report
1f-70
QoE Report

FIG. 1G

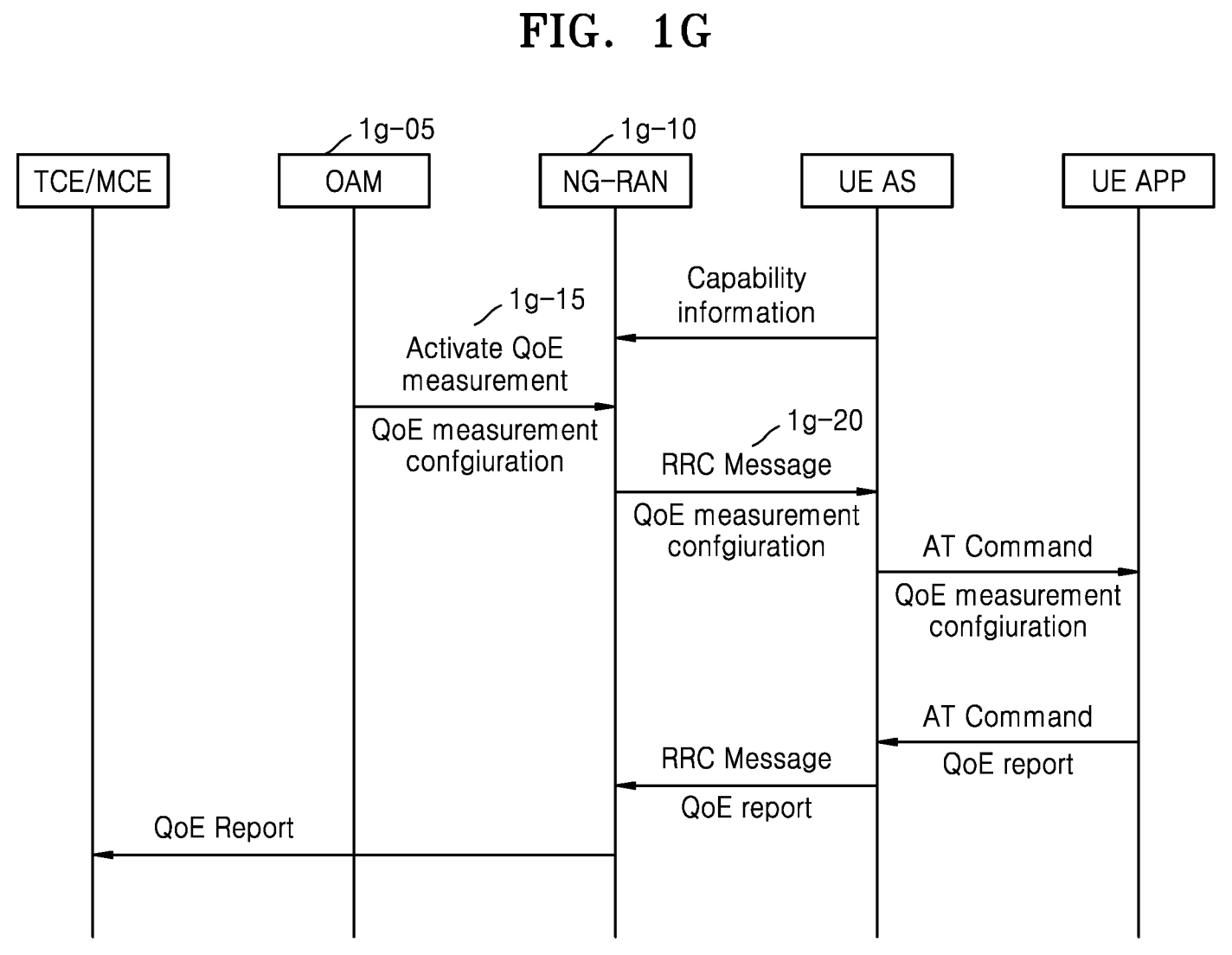

TCE/MCE
OAM
1g-05
NG-RAN
1g-10
UE AS
UE APP
1g-15
Activate QoE measurement
QoE measurement configuration
Capability information
1g-20
RRC Message
QoE measurement configuration
AT Command
QoE measurement configuration
AT Command
QoE report
RRC Message
QoE report
QoE Report

METHOD AND DEVICE FOR MANAGING QOE OF TERMINAL IN WIRELESS COMMUNICATION SYSTEM

TECHNICAL FIELD

The present disclosure relates to a method and device that allow a user equipment (UE) to manage quality of experience (QoE) in a wireless communication system.

BACKGROUND ART

Efforts have been made to develop an improved 5th generation (5G) communication system or pre-5G communication system to keep up with growing wireless data traffic demand after the commercialization of 4th generation (4G) communication systems. For this reason, the 5G or pre-5G communication system is referred to as a beyond 4G network communication system or a post long-term evolution (LTE) system. A 5G communication system defined by the $3^{rd}$ Generation Partnership Project (3GPP) is referred to as a new radio (NR) system. Implementation of 5G communication systems in an ultra-high frequency (millimeter-wave (mmWave)) band (such as a 60-GHz band) is under consideration to achieve high data transfer rates. To mitigate path loss of radio waves and increase transmission distance of radio waves in an ultra-high frequency band for 5G communication systems, technologies such as beamforming, massive multiple-input multiple-output (MIMO), full dimensional MIMO (FD-MIMO), array antennas, analog beamforming, and large-scale antennas have been studied and applied to NR systems. Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (COMP), and received-interference cancellation have been developed. In addition, for 5G systems, advanced coding modulation (ACM) schemes, such as Hybrid FSK and QAM Modulation (FQAM) and Sliding Window Superposition Coding (SWSC), and advanced access techniques, such as Filter Bank Multicarrier (FBMC), non-orthogonal multiple access (NOMA), sparse code multiple access (SCMA), etc. have been developed.

Moreover, the Internet has evolved from a human-centered connection network, in which humans create and consume information, to the Internet of things (IoT) network in which dispersed components such as objects exchange information with one another to process the information. Internet of Everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, healthcare, smart home appliances, advanced medical services, etc., through convergence and integration between existing information technology (IT) and various industries.

Thus, various attempts are being made to apply a 5G communication system to the IoT network. For example, technologies such as sensor networks, M2M communication, MTC, etc., are implemented using 5G communication techniques such as beamforming, MIMO, array antennas, etc. The application of a cloud RAN as the above-described big data processing technology may be an example of convergence between the 5G and IoT technologies. As various services may be provided as a result of the advancements in mobile communication systems, a method of effectively providing these services is required.

DISCLOSURE

Technical Problem

The present disclosure provides a method and device that allow a user equipment (UE) to manage quality of experience (QoE) in a wireless communication system.

Technical Solution

According to an embodiment of the present disclosure, there may be provided a method, performed by a UE, of managing QoE in a wireless communication system, the method including establishing a radio resource control (RRC) connection with a base station, transmitting UE capability information to the base station, receiving, from the base station, logged QoE measurement configuration information generated based on the UE capability information, logging QoE measurement results based on the received logged QoE measurement configuration information, receiving a QoE data retrieval request from the base station, and transmitting logged QoE measurement result data to the base station.

According to an embodiment of the present disclosure, there may be provided an operation method of a base station that communicates with a UE managing QoE in a wireless communication system, the operation method including establishing an RRC connection with the UE, receiving UE capability information from the UE, generating logged QoE measurement configuration information based on the UE capability information and QoE measurement-related information received from Operations, Administration, and Maintenance (OAM) or a core network (CN) and transmitting the generated logged QoE measurement configuration information to the UE, transmitting a QoE data retrieval request to the UE, and receiving, from the UE, QoE measurement result data logged based on the logged QoE measurement configuration information.

According to an embodiment of the present disclosure, there may be provided a UE for managing QoE in a wireless communication system, the UE including a transceiver and a processor coupled to the transceiver. The processor may be configured to establish an RRC connection with a base station, transmit, via the transceiver, UE capability information to the base station, receive, via the transceiver, from the base station, logged QoE measurement configuration information generated based on the UE capability information and QoE measurement-related information received from an OAM or CN, log QoE measurement results based on the received logged QoE measurement configuration information, receive, via the transceiver, a QoE data retrieval request from the base station, and transmit, via the transceiver, logged QoE measurement result data to the base station.

DESCRIPTION OF DRAWINGS

FIG. 1G is a diagram for describing a procedure for configuring/reporting management-based QoE measurement, according to an embodiment of the present disclosure.

MODE FOR INVENTION

Figure 1A:
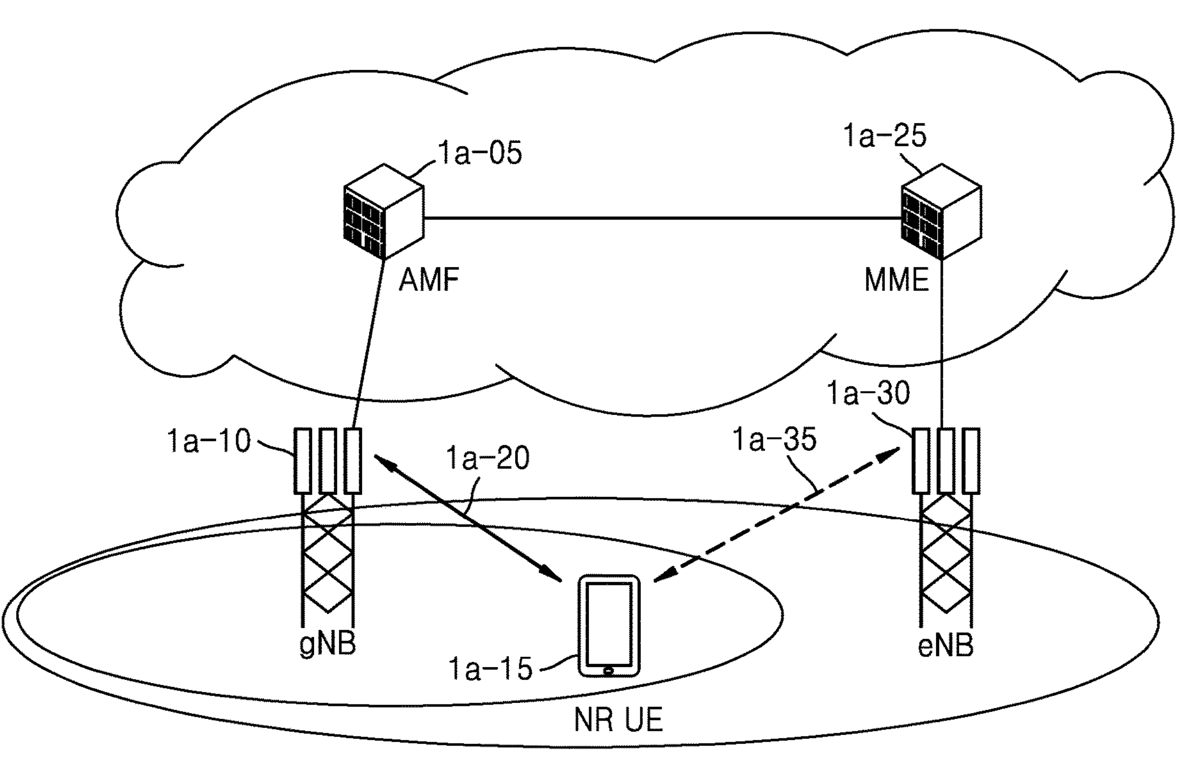
FIG. 1A is a diagram for describing a structure of a next-generation mobile communication system, according to an embodiment of the present disclosure.

Hereinafter, embodiments of the present disclosure will be described in detail with reference to the accompanying drawings.

In the following description of embodiments, descriptions of technical features that are well known in the art to which the present disclosure pertains and are not directly related to the present disclosure are omitted. This is for clearly describing the essence of the present disclosure without obscuring it by omitting the unnecessary descriptions.

For the same reason, in the accompanying drawings, some components are exaggerated, omitted, or schematically illustrated. Furthermore, the size of each element does not entirely reflect an actual size thereof. In the drawings, like reference numerals refer to the same or corresponding elements throughout.

Advantages and features of the present disclosure and methods of accomplishing the same will be more readily appreciated by referring to the following description of embodiments and the accompanying drawings. However, the present disclosure is not limited to embodiments set forth below but may be embodied in many different forms; rather, the present embodiments are provided so that the present disclosure will be thorough and complete and will fully convey the scope of the present disclosure to those of ordinary skill in the art, and the present disclosure is only defined by the appended claims. Throughout the specification, like reference numerals refer to like elements.

It will be understood that each block of a flowchart in the drawings and combinations of blocks of the flowchart may be performed by computer program instructions. These computer program instructions may be loaded into a processor of a general-purpose computer, a special-purpose computer, or other programmable data processing equipment, and thus, the instructions performed via the processor of the computer or other programmable data processing equipment generate a means for performing functions specified in the flowchart block(s).

The computer program instructions may also be stored in a computer-executable or computer-readable memory capable of directing a computer or other programmable data processing equipment to implement functions in a specific manner, and thus, the instructions stored in the computer-executable or computer-readable memory may produce an article of manufacture including instruction means for performing the functions described in the flowchart block(s).

The computer program instructions may also be loaded into a computer or other programmable data processing equipment, and thus, instructions for operating the computer or the other programmable data processing equipment by generating a computer-executed process when a series of operations are performed in the computer or the other programmable data processing equipment may provide operations for performing the functions described in the flowchart blocks.

Furthermore, each block may represent a portion of a module, segment, or code that includes one or more executable instructions for executing specified logical function(s). It should also be noted that, in some alternative implementations, functions mentioned in blocks may occur out of order. For example, two blocks illustrated in succession may be executed substantially simultaneously, or the blocks may sometimes be executed in reverse order depending on functions corresponding thereto.

As used herein, the term 'unit' denotes a software element or a hardware element such as a field-programmable gate array (FPGA) or an application-specific integrated circuit (ASIC), and performs certain functions. However, the term 'unit' is not limited to software or hardware. The 'unit' may be configured to be in an addressable storage medium or configured to operate one or more processors.

Thus, the term 'unit' may include, for example, elements such as software elements, object-oriented software elements, class elements, and task elements, processes, functions, attributes, procedures, subroutines, segments of program code, drivers, firmware, micro-codes, circuits, data, a database, data structures, tables, arrays, and variables.

Functions provided by the elements and 'units' may be combined into a smaller number of elements and 'units', or may be further divided into additional elements and 'units'. Furthermore, the elements and 'units' may be embodied to reproduce one or more central processing units (CPUs) in a device or security multimedia card. In addition, in an embodiment, the 'unit' may include one or more processors.

According to an embodiment of the present disclosure, a method, performed by a user equipment (UE), of managing quality of experience (QoE) in a wireless communication system may include: establishing a radio resource control (RRC) connection between the UE and a base station; transmitting UE capability information to the base station; receiving, from the base station, logged QoE measurement configuration information generated based on the UE capability information; in response to the receiving of the logged QoE measurement configuration information, releasing the RRC connection; logging QoE measurement results based on the received logged QoE measurement configuration information; reestablishing the RRC connection between the UE and the base station; reporting availability of logged QoE data to the base station; receiving a QoE data retrieval request from the base station; and transmitting logged QoE data to the base station.

FIG. 1A is a diagram for describing a structure of a next-generation mobile communication system.

Referring to FIG. 1A, a radio access network for a next-generation (new radio (NR)) mobile communication system consists of a next-generation base station (an NR Node B) (hereinafter referred to as a gNB) 1*a*-10 and an access and mobility management function (AMF) 1*a*-05. A new radio UE (hereinafter referred to as an NR UE or UE) 1*a*-15 may connect to an external network via the gNB 1*a*-10 and the AMF 1*a*-05.

In FIG. 1A, the gNB corresponds to an evolved Node B (eNB) in a legacy long-term evolution (LTE) system. The gNB is connected to the NR UE via a radio channel and may provide superior services than a legacy node B (1*a*-20). In the next-generation mobile communication system, because all user traffic is served through a shared channel, an entity is required which performs scheduling by collecting status information such as buffer states, available transmit power states, and channel states for UEs, and the gNB 1*a*-10 is responsible for this function. One gNB generally controls multiple cells. To achieve ultra-high-speed data transfer as compared to the legacy LTE, the next-generation mobile communication system may have bandwidths wider than the existing maximum bandwidth and utilize orthogonal frequency division multiplexing (OFDM) as a radio access scheme in conjunction with an additional beamforming technique. Furthermore, the gNB 1*a*-10 may apply adaptive modulation & coding (hereinafter referred to as AMC) that determines a modulation scheme and a channel coding rate according to a channel state of the UE. The AMF 1*a*-05 may perform functions such as mobility support, bearer configuration, quality of service (QOS) configuration, etc.

The AMF is an entity responsible for performing various control functions as well as mobility management for a UE and is connected to multiple base stations. Furthermore, the next-generation mobile communication system may interwork with the legacy LTE system, and the AMF is connected with a mobility management entity (MME) 1*a*-25 via a network interface. The MME is connected to an eNB 1*a*-30 that is a legacy base station. Th UE supporting LTE-NR dual connectivity may transmit and receive data while maintaining a connection to not only the gNB but also the eNB (1*a*-35).

Figure 1B:
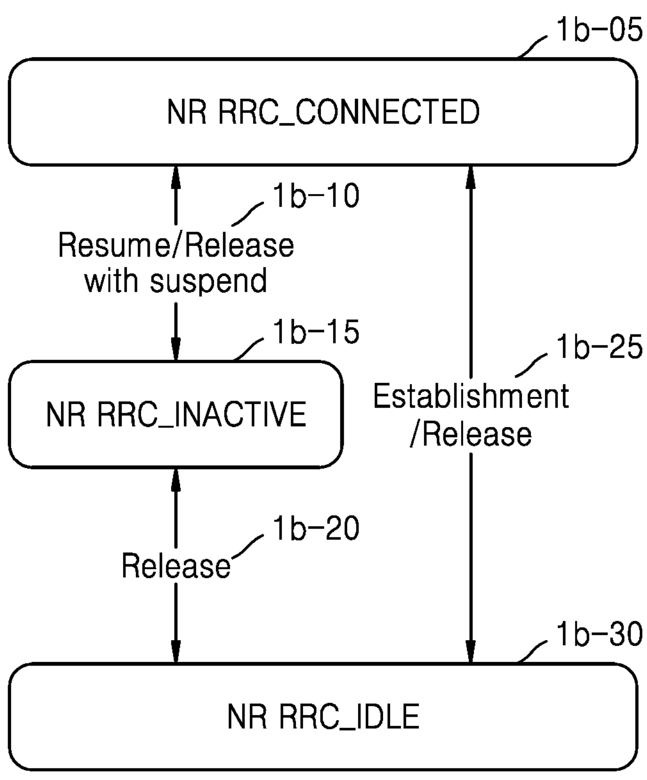
FIG. 1B is a diagram for describing radio resource control (RRC) state transitions in a next-generation mobile communication system, according to an embodiment of the present disclosure.

FIG. 1B is a diagram for describing RRC state transitions in a next-generation mobile communication system, according to an embodiment of the present disclosure.

In the next-generation mobile communication system, there are three RRC states. An RRC_CONNECTED mode 1*b*-05 is an RRC state in which a UE can transmit and receive data. An RRC_IDLE mode 1*b*-30 is an RRC state in which the UE monitors whether paging is transmitted to the UE itself. The above two modes are RRC states that are also applied to the legacy LTE system, and the detailed technology is the same as that of the legacy LTE system. In the next-generation mobile communication system, an RRC_INACTIVE mode 1*b*-15 is newly defined. In the RRC_INACTIVE mode 1*b*-15, a UE context is retained in a base station and the UE, and a radio access network (RAN) based paging is supported. Characteristics of the above new RRC state are listed below:

Cell re-selection mobility;

Core network (CN)-NR RAN connection (both control and user planes (C/U-planes) has been established for UE;

The UE AS context is stored in at least one gNB and the UE;

Paging is initiated by NR RAN;

RAN-based notification area is managed by NR RAN; and

NR RAN knows the RAN-based notification area which the UE belongs to.

The new RRC_INACTIVE mode may switch to the RRC CONNECTED mode or the RRC_IDLE mode by using a specific procedure. The UE transitions from the RRC_INACTIVE mode to the RRC_CONNECTED mode according to a resume process, and transitions from the RRC_CONNECTED mode to the RRC_INACTIVE mode by using a release procedure including suspend configuration information (1*b*-10). The above procedure consists of one or more operations in which RRC messages are transmitted and received between the UE and the base station. Furthermore, through a release procedure after the resume process, the UE may transition from the RRC_INACTIVE mode to the RRC_IDLE mode (1*b*-20). The transition between the RRC_CONNECTED mode and the RRC_IDLE mode is performed using the legacy LTE technology. In other words, through an establishment or release procedure, a transition between the RRC_CONNECTED mode and the RRC_IDLE mode is performed (1*b*-25).

Figure 1C:
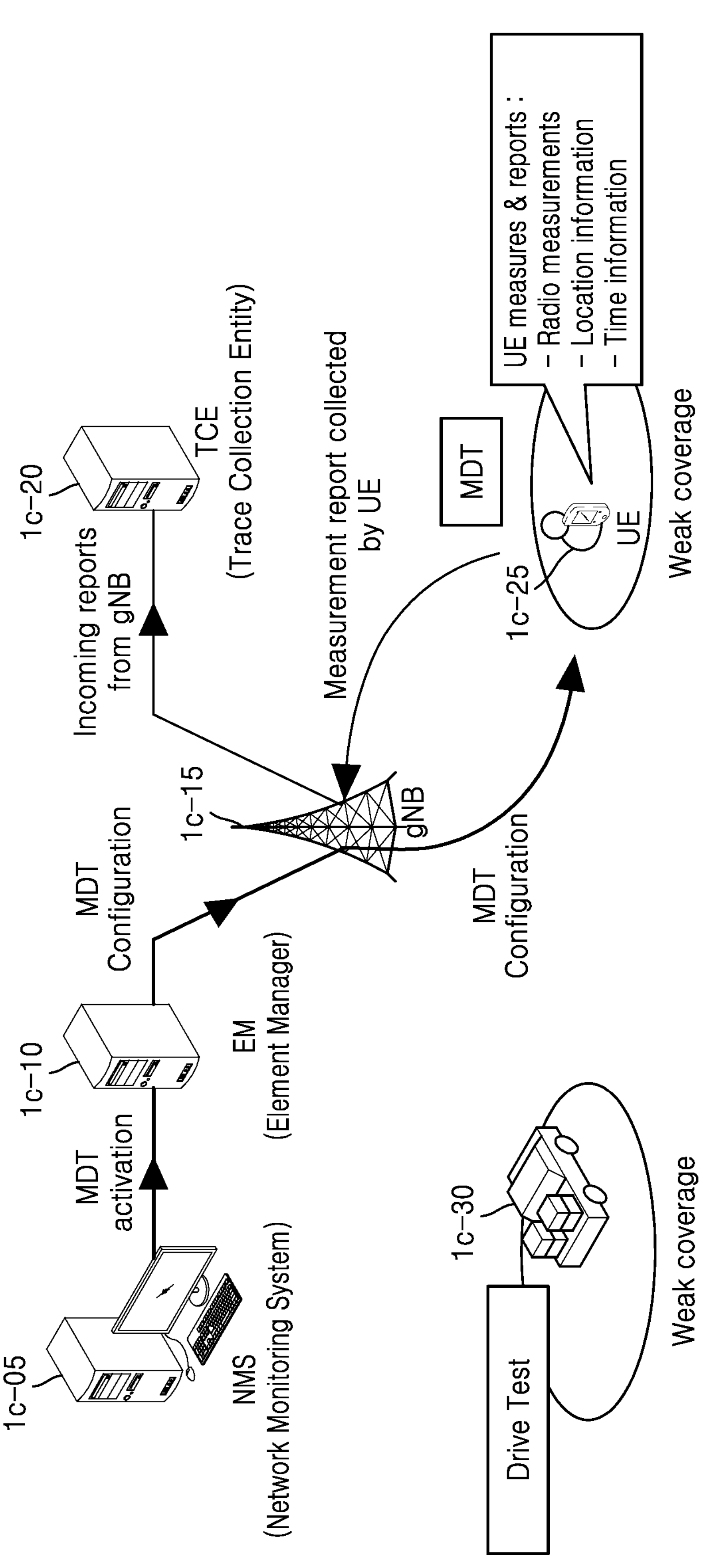
FIG. 1C is a diagram for describing a technique for collecting and reporting cell measurement information, according to an embodiment of the present disclosure.

FIG. 1C is a diagram for describing a technique for collecting and reporting cell measurement information, according to an embodiment of the present disclosure.

When constructing or optimizing a network, a mobile communication operator may measure a signal strength in an expected service area, and deploy base stations in the service area or readjust the deployment based on the measured signal strength. The operator collects cell measurement information in the expected service area with signal measurement equipment carried on a vehicle 1*c*-30. In this way, when the operator collects cell measurement information with the vehicle 1*c*-30, this is time consuming and expensive. The collection process is commonly referred to as a drive test because it generally involves the use of the vehicle 1*c*-30.

A UE 1*c*-25 has a function of measuring a signal received from a base station 1*c*-15 and reporting a measurement result in order to support an operation such as cell reselection, handover, or serving cell addition when moving through cells. Therefore, instead of performing the above-described drive test, the UE 1*c*-25 in the service area may be utilized. A technique for utilizing the UE 1C-25 instead of the drive test is referred to as minimization of drive test (MDT). The operator may configure MDT operations for specific UEs through various components of the network. In addition, the UE in an RRC_CONNECTED mode, an RRC_IDLE mode, or an RRC_INACTIVE mode may collect and store signal strength information from a serving cell and neighboring cells. The UE 1*c*-25 may store not only the signal strength information but also various other information, such as location information, time information, signal quality information, etc. The stored information may be reported to the network when the UE 1*c*-25 is in the RRC_CONNECTED mode, and transmitted to a specific server.

MDT operations may be largely classified into Immediate MDT and Logged MDT.

Immediate MDT refers to a mode in which the UE 1*c*-25 reports collected information immediately to the network. Because reporting has to be immediately performed, only the RRC_connected UE 1*c*-25 can perform the Immediate MDT. In general, the Immediate MDT is performed by applying an existing radio resource management (RRM) measurement process for supporting operations such as handover and serving cell addition, and location information, time information, etc. are additionally reported to the network.

Logged MDT refers to a mode in which the UE 1*c*-25 stores the collected information without directly reporting it immediately to the network and then reports the stored information after transitioning to the RRC_CONNECTED mode. The UE 1*c*-25 in an RRC_IDLE mode that cannot immediately report the collected information to the network performs the Logged MDT. The UE 1*c*-25 in an RRC_INACTIVE mode newly introduced in the next-generation mobile communication system performs the Logged MDT. When the specific UE 1*c*-25 is in the RRC_CONNECTED mode, the network provides configuration information for performing a Logged MDT operation to the UE 1*c*-25, and the UE 1*c*-25 collects and stores configured information after transitioning to the RRC_IDLE mode or RRC_INACTIVE mode.

| | RRC state |
|---|---|
| Immediate MDT | RRC_Connected |
| Logged MDT | RRC_Idle, RRC_Inactive |

Figure 1D:
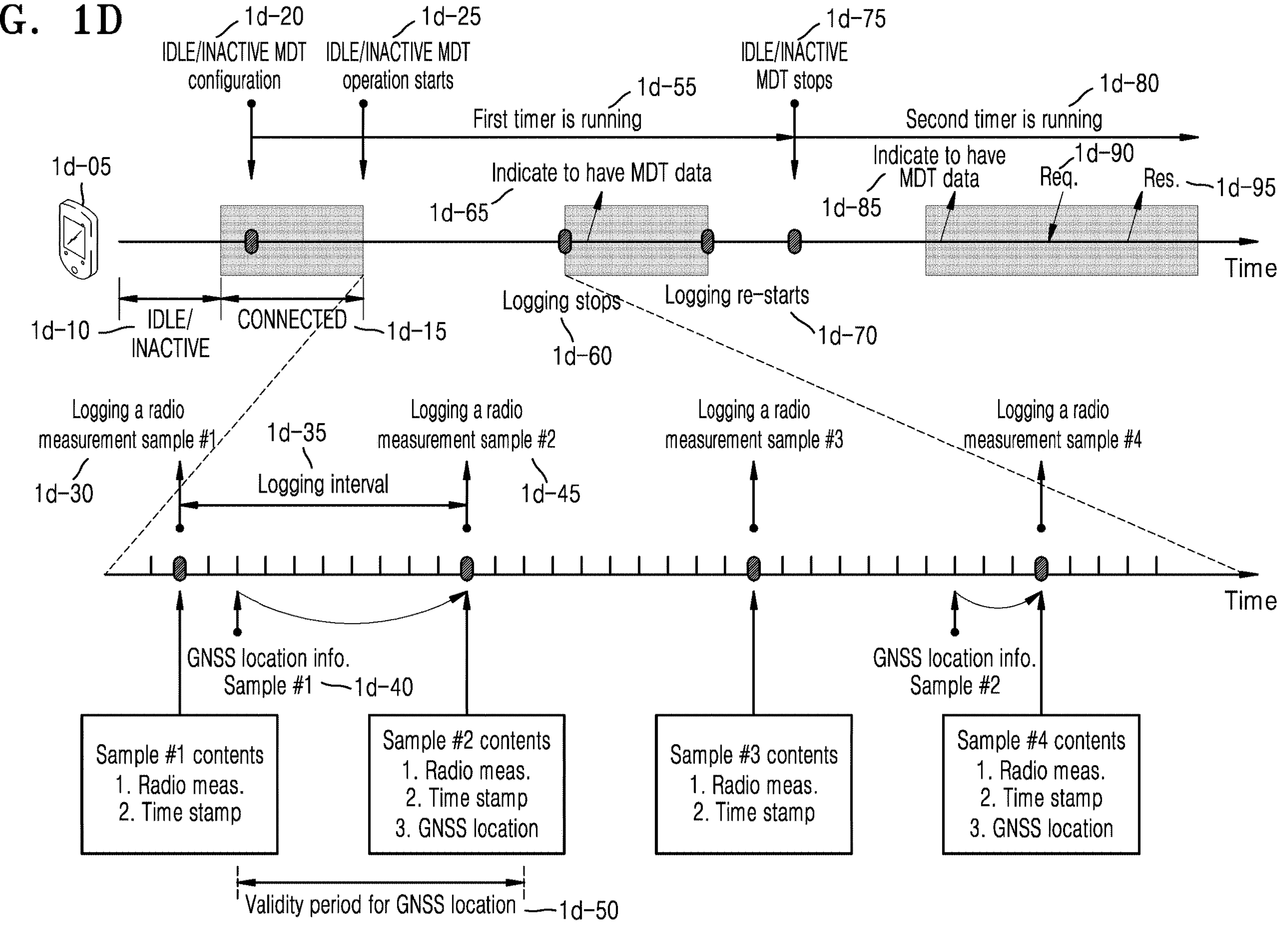
FIG. 1D is a diagram for describing a method of collecting and reporting cell measurement information, according to an embodiment of the present disclosure.

FIG. 1D is a diagram for describing a method of collecting and reporting cell measurement information, according to an embodiment of the present disclosure.

A UE 1*d*-05 transitions from an RRC_IDLE or RRC_INACTIVE mode 1*d*-10 to an RRC_CONNECTED mode 1*d*-15. When in the RRC_CONNECTED mode 1*d*-15, the UE 1*d*-05 collects MDT data and reports it to a base station through an immediate MDT operation. The UE 1*d*-05 that transitions to the RRC_CONNECTED mode 1*d*-15 receives, from the base station, configuration information for Logged MDT performed in the RRC_IDLE or RRC_INACTIVE mode (1*d*-20). The UE 1*d*-05 receives the logged MDT configuration information included in a certain RRC message. Upon receiving the RRC message, the UE 1*d*-05 starts a first timer (1*d*-55). When transitioning to the RRC_IDLE or RRC_INACTIVE mode 1*d*-10, the UE 1*d*-05 performs the Logged MDT operation in an interval for the RRC_IDLE or RRC_INACTIVE mode 1*d*-10 until the first timer expires (1*d*-25). A value of the first timer may be included in the logged MDT configuration information.

The UE 1*d*-05 stores certain information collected for each configured period, i.e., each logging interval 1*d*-35 (1*d*-30 and 1*d*-45). Furthermore, if the UE 1*d*-05 has collected valid location information 1*d*-40, the UE 1*d*-05 may store the valid location information 1*d*-40. The location information may be determined to be valid for a predetermined period 1*d*-50 after the location information is collected. The predetermined period may be shorter than or equal to the logging interval.

Even before the first timer expires, upon transitioning to the RRC_CONNECTED mode 1*d*-15, the UE 1*d*-05 temporarily stops the Logged MDT operation from being performed (1*d*-60). However, the first timer may continue to run without stopping even during an interval for the RRC_CONNECTED mode 1*d*-15. In other words, the first timer continues to run regardless of a change in the RRC state of the UE 1*d*-05. However, if the UE 1*d*-05 has an insufficient memory for storing MDT data and can no longer store data, or if the logged MDT configuration information is released, the first timer is stopped. The logged MDT configuration information is released when the UE 1*d*-05 receives other logged MDT configuration information in a serving RAT or another RAT or when the UE 1*d*-05 is detached from the network or is powered off.

During RRC Connection Establishment or RRC Connection Resume, the UE 1*d*-05 may report, to the base station, availability of collected information (MDT data) stored therein by using an RRC Setup Complete message or RRC Resume Complete message (1*d*-65). The UE 1*d*-05 may also report the availability to the base station via an RRC Reestablishment Complete or RRC Reconfiguration Complete message.

The RRC Connection Establishment is a procedure in which the UE 1*d*-05 transitions from the RRC_IDLE mode to the RRC_CONNECTED mode 1*d*-15. As described below, the RRC Connection Establishment generally consists of three steps, and three types of RRC messages are used.

- Step 1: The UE transmits an RRC Setup Request message to the base station.
- Step 2: The base station transmits an RRC Setup message to the UE.
- Step 3: The UE transmits an RRC Setup Complete message to the base station.

The RRC Connection Resume is a procedure in which the UE 1*d*-05 transitions from the RRC_INACTIVE mode 1*d*-10 to the RRC_CONNECTED mode 1*d*-15. As described below, the RRC Connection Resume generally consists of three steps, and three types of RRC messages are used.

- Step 1: The UE transmits an RRC Resume Request message to the base station.
- Step 2: The base station transmits an RRC Resume message to the UE.
- Step 3: The UE transmits an RRC Resume Complete message to the base station.

As described above, the UE 1*d*-05 may report information indicating that it has the collected information to a target base station during the RRC Connection Reestablishment and handover, as well as during the RRC Connection Establishment or RRC Connection Resume. If Logged MDT is configured but there is no collected and stored information yet, the UE 1*d*-05 may skip the reporting. Upon receiving the report, the base station may transmit, when necessary, a retrieval request for reports of MDT data stored by the UE 1*e*-05. The UE 1*d*-05 needs to store MDT data that is not reported for a predetermined time period.

If the UE transitions back to the RRC_IDLE mode or the RRC_INACTIVE mode, and the first timer has not yet expired, the UE 1*d*-05 resumes the Logged MDT operation (1*d*-70). When the first timer expires, the UE 1*d*-05 stops the Logged MDT operation (1*d*-75). The UE 1*d*-05 that has stopped the Logged MDT operation may start a second timer (1*d*-80), and retain stored MDT data until the second timer expires. After the second timer expires, whether to discard the stored MDT data may be determined via implementation by the UE 1*d*-05. A value of the second timer may be included in the logged MDT configuration information, or a predefined value may be applied without being configured.

When the UE 1*d*-05 transitions back to the RRC_CONNECTED mode, the UE 1*d*-05 reports to the base station that it has the collected information (MDT data) stored therein (1*d*-85). The base station transmits, to the UE 1*d*-05, a retrieval request for reports of the stored MDT data by using a certain RRC message (1*d*-90).

The UE 1*d*-05 may report a certain RRC message including the stored MDT data to the base station (1*d*-95).

Figure 1E:
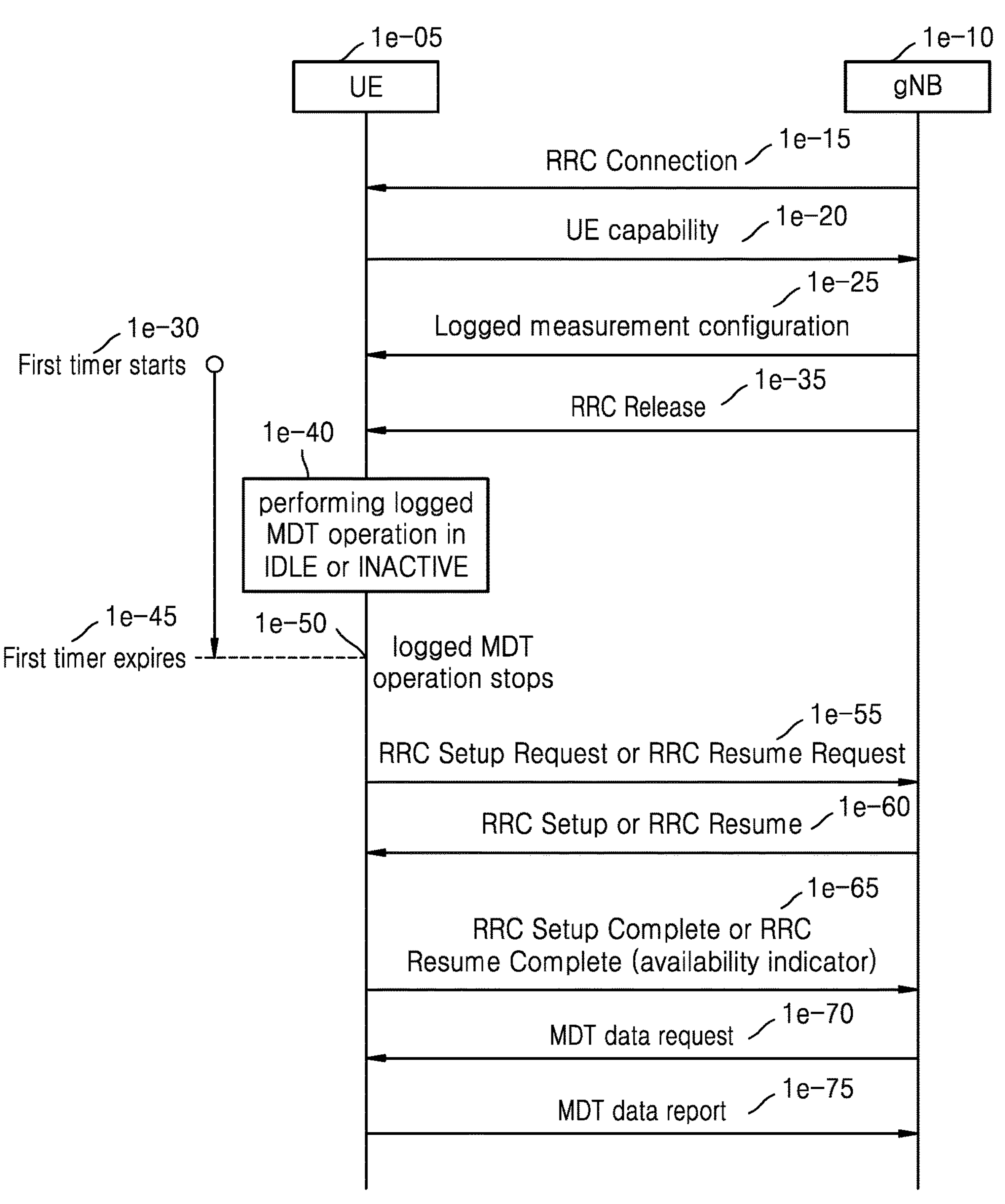
FIG. 1E is a diagram for describing an operation of collecting and reporting cell measurement information, according to an embodiment of the present disclosure.

FIG. 1E is a diagram for describing an operation of collecting and reporting cell measurement information, according to an embodiment of the present disclosure.

In operation 1*e*-15, a UE 1*e*-05 establishes an RRC connection with a base station 1*e*-10.

In operation 1*e*-20, the UE 1*e*-05 may transmit UE capability information to the base station 1*e*-10. The UE capability information may include information about whether the UE 1*e*-05 supports an MDT operation and a frequency on which the UE 1*e*-05 can perform measurements.

In operation 1*e*-25, the base station 1*e*-10 transmits, to the UE 1*e*-05, a certain RRC message including configuration information necessary to perform a Logged MDT operation. In an embodiment of the present disclosure, the configuration information may include at least one of the following information.

- Trace Reference information
- Trace Recording Session Reference information
- Trace collection entity (TCE) identifier (ID) information: The base station transmits MDT data reported from the UE to a data server designated by the TCE ID.
- Absolute time information: Absolute time in the current cell when logged MDT configuration information is provided
- Area configuration: This refers to information about an area where measurement information can be collected and stored through the Logged MDT operation, and the area is indicated in a cell unit. The information may also include information about a RAT for which measurement information should be collected. A list included in the RAT information may be a black list or a white list. If the list is a black list, cell measurement information is collected for RATs not included in the list. If the list is a white list, cell measurement information is not collected for RATs not included in the list.
- Logging duration: This is a value of the first timer described above, and while the first timer is running, the UE performs a Logged MDT operation in an RRC_IDLE or RRC_INACTIVE mode.
- Logging Interval: This is a period for which collected information is stored.
- plmn-IdentityList (i.e. MDT PLMN list): This indicates public land mobile network (PLMN) list information, and includes information about PLMNs where not only the Logged MDT operation but also reporting of availability of MDT data and reporting of the MDT data are allowed.
- An indicator indicating whether the UE performs the Logged MDT operation in RRC_IDLE mode, RRC_INACTIVE mode, or both of them. An RRC state in which the Logged MDT operation is performed may also be indicated using the indicator, or without the indicator, it may be defined that the UE always performs the Logged MDT operation in the RRC_IDLE mode and the RRC_INACTIVE mode. The UE performs the Logged MDT operation only in the RRC state indicated by the indicator.
- An indicator indicating whether to collect and store beam level measurement information. A beam antenna may be applied in a next-generation mobile communication system. Without the indicator, it may be defined that beam level measurements are always collected and stored for a frequency at which a beam-based operation is performed.
- Information about a maximum number of beams collected or stored, and minimum signal strength information of the stored beams The UE skips storage of information about a beam having a signal strength less than the minimum signal strength. If all the beams have a signal strength less than the configured minimum signal strength, the UE may store information about a beam having a highest signal strength among the beams, or include an indicator indicating that all the beams have a signal strength less than the configured minimum signal strength.
- An indicator indicating whether an MDT retrieval operation can be triggered in 2-step RRC Resume.

In operation 1*e*-30, upon receiving the logged MDT configuration information, the UE 1*e*-05 starts a first timer. A value of the first timer is set to be equal to a value of logging duration.

In operation 1*e*-35, the base station 1*e*-10 causes the UE 1*e*-05 to move to the RRC_IDLE or RRC_INACTIVE mode by using an RRC Release message.

According to an RRC state to which the UE 1*e*-05 moves, the RRC Release message may include configuration information for an operation of the UE 1*e*-05 in the selected RRC state.

In operation 1*e*-40, when the first timer is running, the UE 1*e*-05 performs Logged MDT in the RRC_IDLE or RRC_INACTIVE mode. The UE 1*e*-05 measures signal strengths for a serving cell and neighboring cells, and obtains location information. When beam-level measurement is configured, the UE 1*e*-05 collects and stores signal strength values for beams that are greater than the configured minimum value in the serving cell and the neighboring cells. The maximum number of beams that can be stored is set or predefined. The signal strength means a reference signal received power (RSRP), reference signal received quality (RSRQ), or a signal-to-interference-plus-noise ratio (SINR). The UE 1*e*-05 stores the collected information for each logging interval. Information about each log stored for each logging interval includes an indicator indicating whether the stored information was collected in the RRC_IDLE mode or in the RRC_INACTIVE mode. In another embodiment of the present disclosure, the above indicator may be included for each first log in which mode transition occurs. This may minimize signaling overhead due to the indicator.

In operations 1*e*-45 and 1*e*-50, when the first timer expires, the UE 1*e*-05 stops the Logged MDT operation. In a case where the UE 1*e*-05 is in the RRC_IDLE or RRC_INACTIVE mode via the RRC Release message and receives RAN paging or CN paging from the base station, or mobile originated (MO) data transmission is activated, the UE 1*e*-05 initializes an establishment or resume procedure for transitioning from the RRC_IDLE or RRC_INACTIVE mode to the RRC_CONNECTED mode.

The establishment or resume procedure may be composed of the following steps.

- Step 1 (1*e*-55): The UE transmits an RRC Setup Request message or an RRC Resume Request message to the base station.
- Step 2 (1*e*-60): The base station transmits an RRC Setup message or an RRC Resume message to the UE.
- Step 3 (1*e*-65): The UE transmits an RRC Setup Complete message or an RRC Resume Complete message to the base station.

The UE 1e-05 may include an indicator indicating the availability of MDT data stored therein in the RRC Setup Complete or RRC Resume Complete message.

In operation 1e-70, upon receiving the RRC Setup Complete message, the base station 1e-10 may transmit, when necessary, a retrieval request for reports of the MDT data by using a certain RRC message.

In operation 1e-75, upon receiving the request, the UE 1e-05 may report the MDT data to the base station 1e-10 by using a certain RRC message.

In NR, QoE measurement may be activated by performing a signaling-based procedure or a management-based procedure.

Figure 1F:
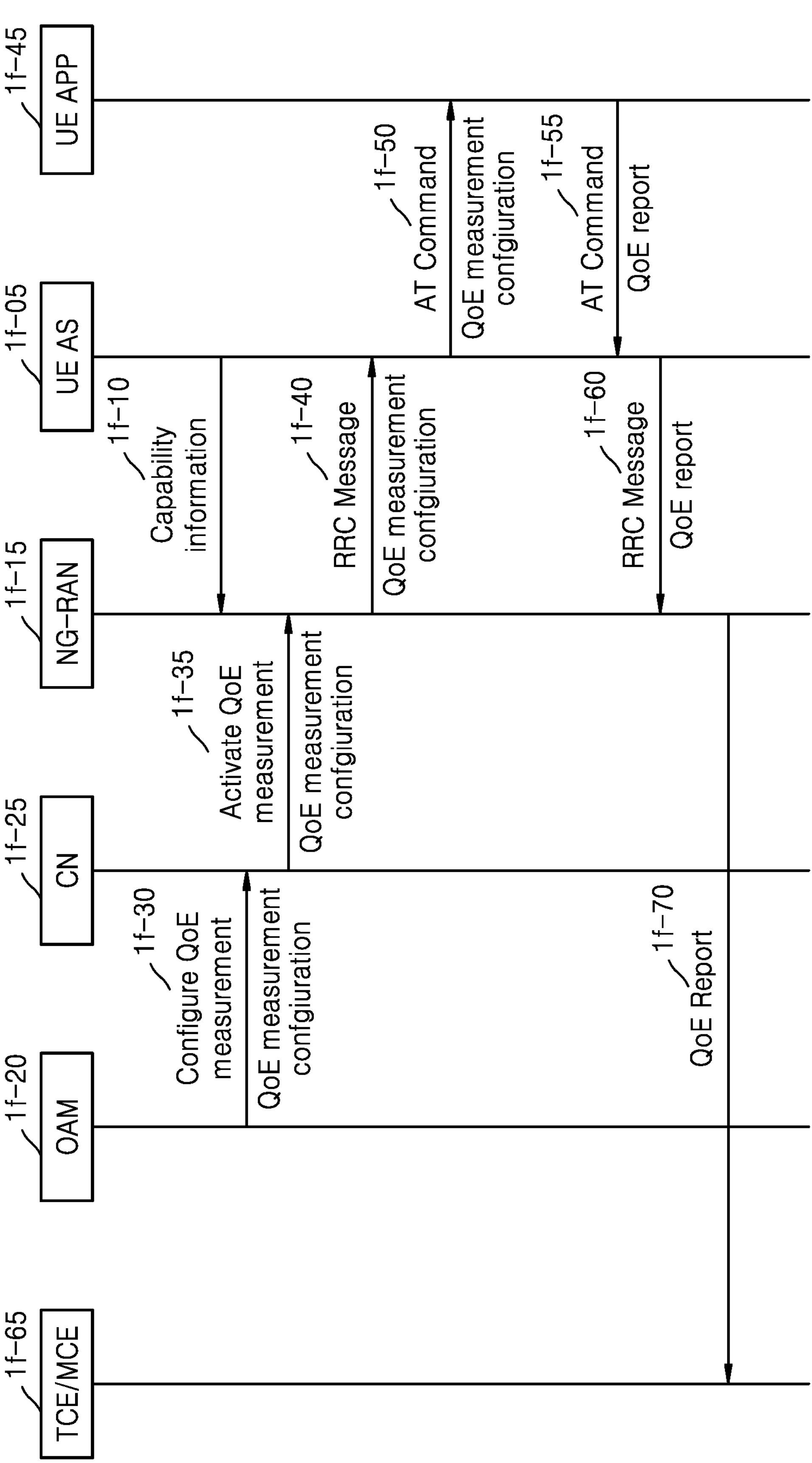
FIG. 1F is a diagram for describing an operation of configuring/reporting signaling-based QoE measurement, according to an embodiment of the present disclosure.

FIG. 1F is a diagram for describing an operation of configuring/reporting signaling-based QoE measurement, according to an embodiment of the present disclosure.

In operation 1f-10, a UE access stratum (AS) 1f-05 may transmit, to a base station (or next-generation random access network (NG-RAN)) 1F) 1f-15, information indicating whether it supports QoE measurement for each service type via a UE capability message. The message may include Abstract Syntax Notation One (ASN.1) information and related parameter descriptions as follows.

```
MeasParameters-v1530 ::=            SEQUENCE {
   qoe-MeasReport-r15                 ENUMERATED {supported}    OPTIONAL,
   qoe-MTSI-MeasReport-r15            ENUMERATED {supported}    OPTIONAL,
   ca-IdleModeMeasurements-r15          ENUMERATED {supported}    OPTIONAL,
   ca-IdleModeValidityArea-r15          ENUMERATED {supported}    OPTIONAL,
   heightMeas-f15                       ENUMERATED {supported}      OPTIONAL,
   multipleCellsMeasExtension-r15       ENUMERATED {supported}      OPTIONAL
}
```

qoe-MeasReport
Indicates whether the UE supports QoE Measurement Collection for streaming services.
qoe-MTSI-MeasReport
Indicates whether the UE supports QoE Measurement Collection for MTSI services.

As described above, for LTE, QoE measurement can be supported for service types such as a streaming service and a multimedia telephony service for Internet Protocol multimedia subsystem (IMS) (MTSI), and in NR, the QoE measurement can be additionally supported for service types such as virtual reality (VR), multimedia broadcast multicast services (MBMS), extended reality (XR), etc.

In operation 1f-30, Operations, Administration, and Maintenance (OAM) 1f-20 provides QoE measurement configuration information to a CN 1f-25.

In operation 1f-35, the CN 1f-25 that has received the configuration information may activate QoE measurement by transmitting the configuration information to the base station 1f-15.

In operation 1f-40, the base station 1f-15 that has received the configuration information may deliver the configuration information to the UE AS 1f-05 via an RRC message (e.g., an RRC Connection Reconfiguration message). The RRC message may include ASN.1 information and related parameter descriptions as follows.

```
measConfigAppLayer-r15                 CHOICE{
    release                              NULL,
    setup                                SEQUENCE{
        measConfigAppLayerContainer-r15              OCTET STRING (SIZE(1..1000)),
        serviceType-r15                              ENUMERATED {qoe, qoemtsi, spare6, spare5,
spare4, spare3, spare2, spare1}
    }
  }  OPTIONAL,                         -- Need ON
```

measConfigAppLayerContainer
The field contains configuration of application layer measurements, see Annex L (normative) in TS 26.247 [90] and clause 16.5 in TS 26.114 [99].
serviceType
Indicates the type of application layer measurement. Value qoe indicates Quality of Experience Measurement Collection for streaming services, value qoemtsi indicates Enhanced Quality of Experience Measurement Collection for MTSI.

In operation 1f-50, if the RRC message is for setting up a configuration, the UE AS 1f-05 may transmit the configuration information to a UE application layer (UE APP) 1f-45 via an AT command. In another embodiment of the present disclosure, if the RRC message is for releasing the configuration, the UE AS 1f-05 may transmit, to the UE APP 1f-45, an AT command to clear the stored configuration information. Specific operations of the UE AS 1f-05 receiving the RRC message may be as follows.

```
1> if the received otherConfig includes the measConfigAppLayer:
  2> if measConfigAppLayer is set to setup:
    3> forward measConfigAppLayerContainer to upper layers considering the serviceType;
    3> consider itself to be configured to send application layer measurement report in accordance with
       5.6.19;
  2> else:
    3> inform upper layers to clear the stored application layer measurement configuration;
    3> discard received application layer measurement report information from upper layers;
    3> consider itself not to be configured to send application layer measurement report.
```

The UE APP 1f-45 may perform QoE measurement according to the received configuration information. Furthermore, in operation 1f-55, the UE APP 1f-45 may report a result of the measurement to the UE AS 1f-05 via an AT command according to the configuration information.

In operation 1f-60, the UE AS 1f-05 may report the measurement result to the base station 1f-15 via an RRC Message (e.g., MeasReportAppLayer message). For reporting a QoE measurement result, signaling radio bearer 4 (SRB4) may be used. The RRC message may include ASN.1 information and related parameter descriptions as follows.

```
MeasReportAppLayer-r15 ::=                SEQUENCE {
  criticalExtensions                        CHOICE {
    measReportAppLayer-r15                    MeasReportAppLayer-r15-IEs,
    criticalExtensionsFuture                  SEQUENCE ( )
  }
}
MeasReportAppLayer-r15-IEs ::=             SEQUENCE {
  measReportAppLayerContainer-r15           OCTET STRING (SIZE (1..8000))      OPTIONAL,
  serviceType-r15                           ENUMERATED {qoe, qoemtsi, spare6, spare5, spare4,
spare3, spare2, spare1}                   OPTIONAL,
  nonCriticalExtension                      MeasReportAppLayer-v1590-IES          OPTIONAL
}
```

measReportAppLayerContainer

The field contains container of application layer measurements, see Annex L (normative) in TS 26.247 [90] and clause 16.5 in TS 26.114 [99).

serviceType

Indicates the type of application layer measurement. Value qoe indicates Quality of Experience Measurement Collection for streaming services, value qoemtsi indicates Quality of Experience Measurement Collection for MTSI.

A specific procedure of the UE AS 1f-05 reporting the measurement result may be as follows.

```
A UE capable of application layer measurement reporting in
RRC_CONNECTED may initiate the procedure when configured
with application layer measurement, i.e. when measConfigAppLayer
has been configured by E-UTRAN.
Upon initiating the procedure, the UE shall:
  1>    if configured with application layer measurement, and SRB4 is
        configured, and the UE has received application layer
        measurement report information from upper layers:
    2>      set the measReportAppLayerContainer in the
            MeasReportAppLayer message to the value of the
            application layer measurement report information;
```

-continued

```
    2>      set the serviceType in the MeasReportAppLayer
            message to the type of the application layer
            measurement report information;
      2>    submit the MeasReportAppLayer message to
            lower layers for transmission via SRB4.
```

In operation 1f-70, the base station 1f-15 may deliver a report on the measurement result to a configured final destination (a TCE or a measurement collection entity (MCE 1f-65).

FIG. 1G is a diagram for describing a procedure for configuring/reporting management-based QoE measurement, according to an embodiment of the present disclosure.

The procedure for configuring/reporting management-based QoE measurement is largely similar to the signaling-based procedure (FIG. 1F). Therefore, descriptions of the operations already provided with reference to FIG. 1F will be omitted below. The omitted operations are the same as those in the signaling-based procedure of FIG. 1F.

In operation 1g-15, an OAM 1g-05 may transmit a QoE measurement configuration to a base station 1g-10 and activate QoE measurement. Unlike the signaling-based procedure, the management-based procedure is performed without going through a CN.

Upon receiving the QoE measurement configuration, the base station finds a single or multiple UEs that meet various conditions (e.g., area scope, application layer capability, and service type). Subsequently, in operation 1g-20, the base station 1g-10 may transmit the QoE measurement configuration to each of the UEs via an RRC message (e.g., an RRC connection reconfiguration message). Other operations and message formats are the same as those described with reference to FIG. 1F (signaling-based procedure).

At the 3GPP meeting, RAN2/3 has reached the following agreements to introduce QoE measurement in NR.

RAN3 #109e

NR QoE management supports following service types:

Streaming video: TS 26.247

VR: TS 26.118

MTSI: TS 26.114

MBMS: TS 26.347

RAN3 #111e

Support XR as new service type for QoE measurement

RAN2 #113e

QoE measurements in RRC_INACTIVE state can be supported, for multicast/broadcast services (MBS).

QoE measurements in RRC_IDLE state can be supported, for MBS.

In legacy LTE, QoE measurements (as described with reference to FIGS. 1F and 1G) were supported only in RRC_CONNECTED mode. On the other hand, in NR, QoE measurements are supported in RRC_INACTIVE mode or RRC_IDLE mode for MBMS or MBS. In the future, QoE measurements may be supported in RRC_INACTIVE and RRC_IDLE mode for various service types, as well as MBS.

Figure 1H:
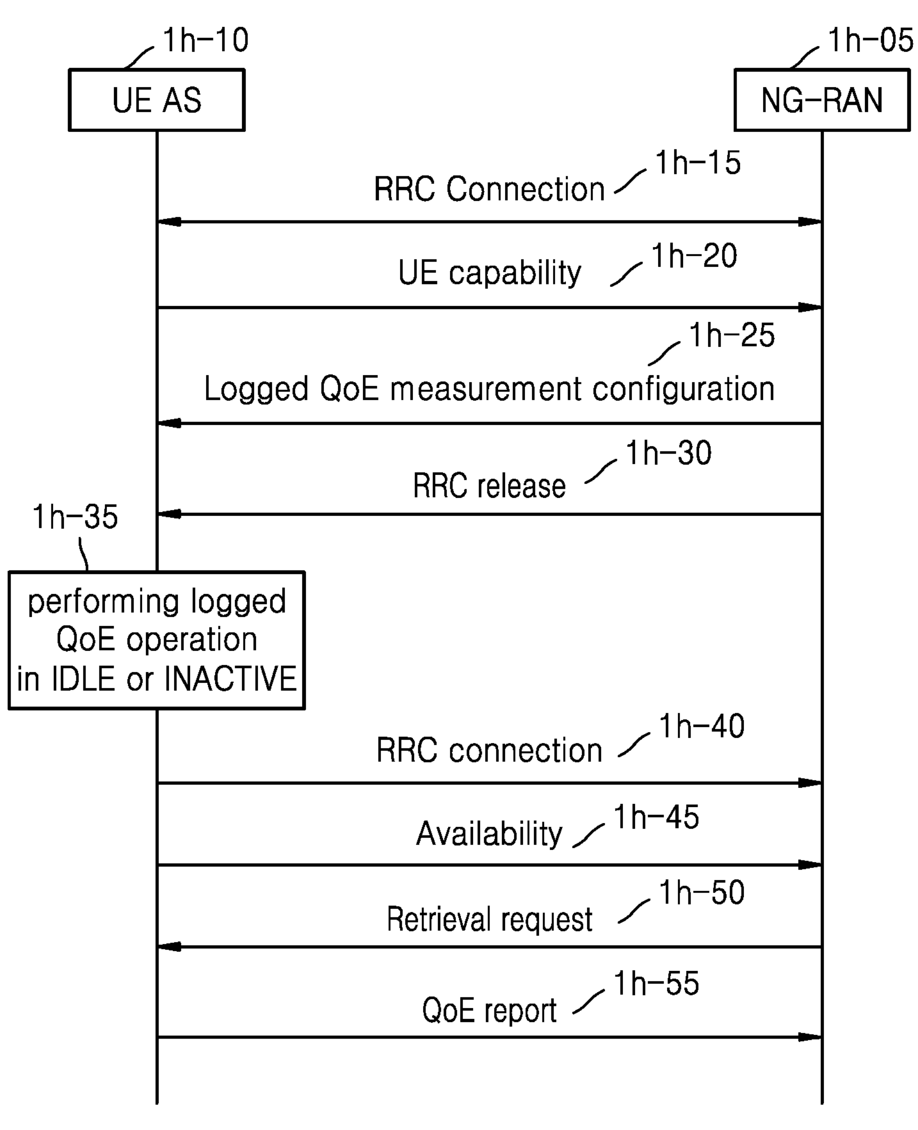
FIG. 1H is a diagram for describing operations between a base station and a user equipment access stratum (AS) for QoE measurement, according to an embodiment of the present disclosure.

FIG. 1H is a diagram for describing operations between a base station and a user equipment access stratum (AS) for QoE measurement, according to an embodiment of the present disclosure.

FIG. 1H illustrates a method of performing QoE measurements in an RRC_INACTIVE mode and an RRC_IDLE mode. In detail, the overall procedure among all entities (TCE/MCE, OAM, NG-RAN, UE AS, and UE APP) is based on the procedures and descriptions with reference to FIGS. 1F and 1G. In particular, FIG. 1H mainly illustrates a signaling procedure between a base station (or NG-RAN) 1h-05 and a UE AS 1h-10 and operations in the signaling procedure.

In operation 1h-15, the UE AS 1h-10 may establish an RRC connection with the base station 1h-05.

In operation 1h-20, the UE AS 1h-10 may provide UE capability information to the base station 1h-05. As in FIGS. 1F and 1G, the UE AS 1h-10 may report QoE-related UE capabilities to the base station for each type of service it supports. Furthermore, the UE may report its capabilities related to logged QoE measurement to the base station. The UE capabilities may include some or all of the following capabilities.

Capability to receive a logged QoE measurement configuration and perform a procedure according to the configuration.

Capability for QoE measurements in RRC_INACTIVE and/or RRC_IDLE modes

Capability to log QoE measurement results in RRC_INACTIVE and/or RRC_IDLE modes

Capability to report whether QoE measurement results are logged (i.e., availability of logged QoE measurement results) in RRC_CONNECTED mode Capability to receive a request (i.e., retrieval request) to retrieve QoE measurement result data in RRC_CONNECTED mode and perform a procedure according to the request Capability to report QoE measurement results in RRC_CONNECTED mode In operation 1h-25, the base station 1h-05 may transmit, to the UE AS 1h-10, logged QoE measurement configuration information for QoE measurement in the RRC_INACTIVE/RRC_IDLE mode, which is received from an OAM or CN. The configuration information may include some or all of the following information.

A container for containing application layer QoE measurement configuration information in RRC_INACTIVE/RRC_IDLE mode Application layer QoE measurement configuration information (e.g., measConfigAppLayerContainer) in the RRC_CONNECTED mode may be reused. Furthermore, it may be configured separately from the application layer QoE measurement configuration information in the RRC_CONNECTED mode.

Service type This may specify which service type the logged QoE measurement configuration is for.

ID (RRC level ID) used to identify the QoE measurement configuration at an RRC level: This ID may be included in RRC signaling when configuring QoE measurements and reporting the measurements. For example, if the RRC level ID is set to 1 when configuring a QoE measurement, a UE AS layer or application layer may include the RRC level ID as 1 in a QoE measurement report generated based on the QoE measurement configuration. Also, the RRC level ID may be mapped to a QoE reference (a value that identifies a QoE measurement configuration at OAM, CN, or TCE/MCE level) in the base station. For example, the base station that has received a QoE measurement configuration with the QoE reference set to 351 may map the QoE reference to the RRC level ID of 3 and store the mapping therebetween. The base station may then deliver QoE measurement configuration information containing the RRC level ID of 3 to the UE. The UE may include information that the RRC level ID is 3 in a QoE measurement report generated based on the QoE measurement configuration information and transmit it to the base station, and the base station may confirm that the RRC level ID of 3 is mapped to QoE reference of 351 and transmit the QoE measurement report including the QoE reference of 351 to the OAM, CN, or TCE/MCE.

Trace Reference information

Trace Recording Session Reference information

Trace collection entity (TCE) ID information: The base station transmits QoE data information reported from the UE to a data server designated by the TCE ID.

Absolute time information: Absolute time in the current cell when logged QoE measurement configuration information is provided. The time information may be used to correlate MDT measurement results with QoE measurement results.

Area configuration: This is information about an area where measurement information can be collected and stored through a Logged QoE measurement operation, and the area is indicated in a cell unit.

Logging Duration: This is a period of time in which logged QoE measurement configuration information is valid. The UE may start a timer when receiving the logged QoE measurement configuration information, and log a QoE report from an application layer while the timer is running. The timer expires when the base station releases the logged QoE measurement configuration information or when the period of time elapses, and the UE may not thereafter log a QoE report from the application layer.

Logged data validity time: This indicates a validity time of logged data received from the application layer. The UE starts a timer when receiving QoE data information from the application layer and logging the QoE data information. The timer may also be started for each QoE data. While the timer is running, the UE may log QoE data. When the validity time elapses or when the timer is expired by the base station, the UE may not additionally log QoE data from the application layer.

Retrieval validity time: This indicates a validity time for retrieval of data received from the application layer. The UE may start a timer when receiving QoE data information from the application layer and logging it. The timer may also be started for each QoE data. Alternatively, the timer may be started the moment the UE receives a configuration. For each service type, the timer may be started, and have a varying length. If the base station makes a retrieval request while the timer is running, the UE may report logged data. When the validity time elapses or the timer is expired by the base station, the UE may not report logged data even if the base station makes a retrieval request.

Report validity time: This indicates a validity time for report of data received from the application layer. The UE may start a timer when receiving QoE data information from the application layer and logging it. The timer may also be started for each QoE data. In another embodiment, the timer may be started the moment the UE receives a configuration. For each service type, the timer may be started and have a varying length. While the timer is running, the UE may report logged data. When the validity time elapses or the timer is expired by the base station, the UE may not thereafter report logged data.

plmn-IdentityList (i.e. Logged QoE PLMN list): This indicates PLMN list information and may include information about PLMNs where not only the Logged QoE measurement operation but also reporting of the availability of logged QoE data and reporting of the logged QoE data are allowed.

An indicator indicating whether the UE performs the Logged QoE measurement operation in at least one of RRC_IDLE mode or RRC_INACTIVE mode. The indicator may also be used to indicate an RRC state in which the Logged QoE measurement operation is performed. Alternatively, without the indicator, it may be defined that the UE always perform the Logged QoE measurement operation in the RRC_IDLE mode and RRC_INACTIVE mode. The UE performs the Logged QoE measurement operation only in the RRC state indicated by the indicator. If the Logged QoE measurement operation is performed in the RRC_CONNECTED mode, the indicator may indicate/be extended to include the RRC_CONNECTED mode as well.

Reporting type: This may specify a method of reporting that should be performed by the UE (e.g., periodically or whenever an event occurs). For periodic reporting, the UE may periodically report whenever there is logged QoE data available. For event-based reporting, the UE may report logged QoE data when a specific event (e.g., throughput decrease and delay increase) occurs during application layer measurement or the UE receives an indicator indicating that the specific event has occurred.

Threshold for QoE data size: Only when a logged data size exceeds the threshold, the UE may report logged QoE data to the base station. This may be applied per service type. That is, only when a logged data size for one service type exceeds a threshold for the service type, the UE may report logged QoE data to the base station.

Threshold for the number of QoE data: Only when the number of logged data exceeds the threshold, the UE may report the logged QoE data to the base station. This may be applied per service type. That is, the UE may report to the base station only when the number of logged data for one service type exceeds a threshold for the service type.

Direct QoE measurement, logging, or reporting indicator: If the indicator is configured, the UE may perform QoE measurement, logging, or reporting in a corresponding cell.

In an embodiment of the present disclosure, the pieces of configuration information may be indicated separately for RRC_IDLE mode and RRC_INACTIVE mode. In another embodiment of the present disclosure, the pieces of configuration information may be specified as a plurality of pieces of information, e.g., by service type or by priority.

A priority may be a value determined by the application layer for each QoE measurement data and provided to the UE AS. For example, if degraded performance is measured for a specific performance metric, such as throughput or delay, the UE application layer may assign a low priority to corresponding data. If not, the UE application layer may assign a high priority to the data and inform the UE AS of the priority. In this case, the UE application layer may transmit the priority and the corresponding QoE data together to the UE AS via an AT command. A priority may be set for each QoE data, or an average priority may be set for a plurality of QoE data. As another example, a plurality of priorities may be specified within a single piece of QoE data. The UE may store the above configuration information as a UE variable.

The base station **1*h*-05** may transmit the QoE measurement configuration information to the UE by including it in a dedicated message as shown below.

RRC Release message: The base station may use this message in order for the UE to transition to RRC_INACTIVE/RRC_IDLE mode, and the message may include the QoE measurement configuration information.

Logged Measurement Configuration message: This is a message containing configuration information for Logged MDT, and may include the QoE measurement configuration information in addition to the configuration information for Logged MDT. Alternatively, the configuration information for Logged MDT and the QoE measurement configuration information may share common information.

RRCReconfiguration message: This message may be configured together with QoE measurement configuration information in conventional RRC_CONNECTED mode. Alternatively, the message may be configured separately from the QoE measurement configuration information in the conventional RRC_CONNECTED mode. When the UE transitions to RRC_INACTIVE or RRC_IDLE mode, the QoE measurement configuration information may be stored without being discarded and used for QoE measurement.

Other existing dedicated downlink RRC messages

New dedicated RRC message: A new message (e.g., Logged QoE Measurement Configuration) may be defined for the logged QoE measurement configuration.

The base station 1*h*-05 may transmit the QoE measurement configuration information to the UE in a broadcast message as shown below.

System Information Block (SIB)

Multicast control channel (MCCH): MCCH is a channel used for transmitting control messages related to an MBMS service, and may be reused.

In an embodiment of the present disclosure, one RRC message may include a plurality of pieces of QoE measurement configuration information.

In operation 1*h*-30, the UE that has received the logged QoE measurement configuration information may release the RRC connection. In addition, the UE application layer may perform QoE measurement according to the configuration information and report a measurement result to the UE AS 1*h*-10.

In operation 1*h*-35, the UE AS 1*h*-10 may perform, according to the configuration information, logging of QoE measurement results received in the RRC_INACTIVE or RRC_IDLE mode.

In operation 1*h*-40, the UE AS 1*h*-10 may reestablish a connection with the base station. In an embodiment of the present disclosure, when establishing the RRC connection, the UE may report whether QoE data is logged by the UE (availability of logged QoE data) to the base station 1*h*-05 via the following messages.

RRC Reestablishment Complete

RRC Reconfiguration Complete

RRC Resume Complete

RRC Setup Complete

In another embodiment of the present disclosure, operations 1*h*-30 and 1*h*-40 may be omitted. That is, even in the RRC_CONNECTED mode, the UE may report a QoE measurement result to the base station through logging. In this case, in operation 1*h*-35, the UE may perform, according to the configuration information, logging of not only a QoE measurement result received in the RRC_INACTIVE or RRC_IDLE mode but also a QoE measurement result received in the RRC_CONNECTED mode.

In operation 1*h*-45, after establishing the RRC connection, the UE may report whether QoE data is logged by the UE ('Availability') to the base station 1*h*-05 via the following messages.

UE Assistance Information

Other existing dedicated uplink RRC messages

New dedicated message

The Availability may include some or all of the following information.

Whether QoE data logged by the UE exists

Service type associated with logged QoE data

ID used to identify QoE measurement configuration and reporting at the RRC level: This ID may indicate which QoE measurement configuration and reporting triggered transmission of the Availability.

Priority of logged QoE data: High-priority data may be retrieved preferentially by the base station.

A plurality of priorities in logged QoE data

Remaining logged data validity time for logged QoE data

Remaining retrieval validity time for logged QoE data

Amount or number of logged QoE data

The pieces of Availability information may be indicated separately for logged data in RRC_IDLE mode and RRC_INACTIVE mode. The pieces of configuration information may be provided as a plurality of pieces of information (e.g., by service type, by priority, and by QoE data). In another embodiment of the present disclosure, the pieces of Availability information may also provide average values for a plurality of logged QoE data. In another embodiment of the present disclosure (for example, when a plurality of pieces of configuration information are received in operation 1*h*-25), one RRC message may include a plurality of pieces of Availability information.

The UE AS 1*h*-10 needs to meet some or all of the following conditions to transmit a message including the Availability information.

If the UE logs QoE data received from the application layer

If the UE logs QoE data that has never been reported to the base station

If the UE is in RRC_CONNECTED mode

If a logged QoE data size is larger than a specific threshold (a fixed value defined in the logged QoE measurement configuration information or in the standard)

If the number of logged QoE data is greater than a specific threshold (a value included in the logged QoE measurement configuration information or a fixed value defined in the standard)

If the retrieval validity time has not expired, or if an associated timer (a timer having a length configured in the logged QoE measurement configuration information or a timer of a fixed length defined in the standard) is running.

In an embodiment of the present disclosure, the pieces of configuration information may be triggered separately for data collected in the RRC_IDLE mode and RRC_INACTIVE mode. In another embodiment of the present disclosure, the pieces of configuration information may be triggered separately for each service type and each priority. At this time, the UE may report only the triggered data. A Prohibit timer may be introduced to prevent too frequent availability reports.

In operation 1*h*-50, the base station 1*h*-05, which has received the Availability information from the UE, may request a retrieval from the UE to collect QoE data. The base station may transmit retrieval information to the UE by including it in a dedicated message as shown below.

UE Information Request

RRC Reconfiguration

Other existing dedicated downlink RRC messages

New dedicated RRC message: A new message for the retrieval may be defined.

The base station may transmit the retrieval request to the UE in a broadcast message as shown below.

SIB

MCCH: MCCH is a channel used for transmitting control messages related to an MBMS service, and may be reused.

In addition, even without operation 1*h*-45 (if it is not defined in the standard or is defined but the UE does not transmit Availability information), the base station may request a retrieval from the UE. The UE that receives the retrieval request may not report if there is no logged data, and if there is logged data, the UE may report the logged data according to predetermined conditions.

Information included in the retrieval request may include some or all of the following.

- Indicator indicating whether to collect logged QoE data
- Service type: Retrieval may be requested only for a specific service type.
- ID used to identify QoE measurement configuration and reporting at the RRC level: This ID may indicate which QoE measurement configuration and reporting triggered the retrieval request.
- Logged data validity time: If the time elapsed since the UE AS logged QoE data is within the above value, the UE may report the QoE data. If the time elapsed since the UE AS logged the QoE data is greater than or equal to the above value, the UE cannot report the QoE data. This is because old logged QoE data may be unnecessary information for the base station or TCE.
- Retrieval validity time: The UE shall transmit a QoE report to the base station within the above value from a time point it receives the retrieval request from the base station. After that, the UE cannot transmit a QoE report.
- Threshold for QoE data size. Only when a logged data size exceeds the threshold, the UE may report logged QoE data to the base station. This may be applied per service type. That is, only when a logged data size for one service type exceeds a threshold for the service type, the UE may report logged QoE data to the base station.
- Threshold for the number of QoE data Only when the number of logged data exceeds the threshold, the UE may report the logged QoE data to the base station. This may be applied for each service type. That is, the UE may report to the base station only when the number of logged data for one service type exceeds a threshold for the service type.
- Size of QoE data to be retrieved: This specifies a maximum size of QoE data that the UE AS can report. If a logged data size is larger than the above value, the UE cannot transmit all the logged data but only report a part thereof (in a decreasing order of priority of QoE data, in a decreasing order of priority of service type, or according to the order of First-In First-Out (FIFO), Last-In First-Out (LIFO), or the like).
- Number of QoE data to be retrieved: This specifies the maximum number of QoE data that the UE AS can report. If the number of logged data is greater than the above value, the UE cannot transmit all the logged data but only report a part thereof (in a decreasing order of priority of QoE data, in a decreasing order of priority of service type, or according to the order of FIFO, LIFO, or the like).

In an embodiment of the present disclosure, the pieces of configuration information may be indicated separately for QoE data stored in RRC_IDLE mode and QoE data stored in RRC_INACTIVE mode. In another embodiment of the present disclosure, the pieces of configuration information may be specified as a plurality of pieces of information (e.g., by service type and by priority). In another embodiment of the present disclosure (e.g., when a plurality of pieces of configuration information are received in operation 1_h_-25), one RRC message may include a plurality of the retrieval request information.

In operation 1_h_-55, the UE receiving the retrieval request may report the logged QoE data to the base station 1_h_-05. The QoE data may be reported using the following messages.

- MeasReportAppLayer message: MeasReportAppLayer used for QoE measurement reporting in RRC_CONNECTED mode may be reused. When the UE transmits the MeasReportAppLayer to report QoE measurement in RRC_CONNECTED mode, the UE may report logged QoE measurements (if any) together. A QoE measurement report in the RRC_CONNECTED mode and a QoE measurement report in the RRC_INACTIVE/RRC_IDLE mode may be differentiated within the MeasReportAppLayer. Even if the QoE measurement report in the RRC_INACTIVE/RRC_IDLE mode reuses the MeasReportAppLayer message, it may not be transmitted together with the QoE measurement report in RRC_CONNECTED mode, but may be transmitted independently/separately therefrom according to the present disclosure. The MeasReportAppLayer message may be transmitted via SRB4.
- RRC Reconfiguration Complete message: If the base station requests a retrieval via an RRC Reconfiguration message, the UE may report QoE measurement results via the RRC Reconfiguration Complete message.
- UE Information Response: If the base station requests a retrieval via a UE Information Request message, the UE may report the QoE measurement results via the UE Information Response message.
- UE Assistance Information: In this case, a prohibit timer may be used to prevent random transmission of QoE measurement result reports to the base station.
- Other existing dedicated uplink RRC messages
- New dedicated message: For example, a message such as MeasLoggedReportApplayer may be defined.

The QoE measurement result report may include some or all of the following information.

- A container for reporting application layer QoE data to the base station (e.g., measReportAppLayerContainer)
- Service type associated with reported QoE data
- ID used to identify QoE measurement configuration at the RRC level: This ID may indicate which QoE measurement configuration information is used to generate the QoE measurement result report.
- An indicator indicating whether there is any more logged data (or data to be additionally reported) in addition to the above report
- Absolute time information about the time of logging data: The time information may be used to correlate MDT measurement results with QoE measurement results.
- Relative time information about the time of logging data: Information about how much more time has passed since the time of logging data relative to the absolute time received by the UE via the logged QOE measurement configuration information
- Absolute time information about the time of reporting data: The time information may be used to correlate MDT measurement results with QoE measurement results.
- Relative time information about the time of reporting data: Information about how much more time has passed since the time of reporting data relative to the absolute time information (the absolute time in a cell at a time point when the configuration information is provided) received by the UE via the logged QOE measurement configuration information
- Priority of the QoE data (e.g., information provided by the application layer): This indicates the priority of the data to be reported.
- Trace Reference information
- Trace Recording Session Reference information Trace collection entity (TCE) ID information: The base station transmits QoE data information reported from the UE to a data server designated by the TCE ID.

In an embodiment of the present disclosure, the pieces of QoE measurement report information may be included as a plurality of pieces of information (e.g., by QoE data and by service type). In another embodiment of the present disclosure, the pieces of QoE measurement report information may be indicated separately for logged data in the RRC_IDLE mode and the RRC_INACTIVE mode. In another embodiment of the present disclosure (for example, when a plurality of pieces of configuration information are received in operation 1*h*-25), one RRC message may include a plurality of pieces of QoE measurement report information.

The UE may use some or all of the following conditions to report the QoE measurement result including the above information to the base station 1*h*-05.

If the UE receives a retrieval request from the base station

If the UE stores QoE measurement results (i.e., QoE data)

When the UE is in RRC_CONNECTED mode

If a logged QoE data size is larger than a specific threshold (a fixed value defined in the logged QoE measurement configuration information or in the standard)

If the number of logged QoE data is greater than a specific threshold (a value included in the logged QoE measurement configuration information or a fixed value defined in the standard)

If the retrieval validity time has not expired, or if an associated timer (a timer having a length configured in the logged QoE measurement configuration information or a timer of a fixed length defined in the standard) is running.

If the report validity time has not expired, or if an associated timer (a timer having a length configured in the logged QoE measurement configuration information or a timer of a fixed length defined in the standard) is running If specific condition(s) configured in the logged QoE measurement configuration information or retrieval message are satisfied If specific conditions defined in the standard are satisfied The UE may start reporting the QoE measurement results even without a retrieval request from the base station. In this case, if the UE in RRC_INACTIVE/RRC_IDLE mode decides to report QoE measurement results by using the above conditions, the UE may request an RRC connection via messages such as RRC Setup Request/RRC Resume Request/RRC Reestablishment Request, specifying that the cause for the connection request is for QoE measurement. Upon receiving the cause, the base station may know that the UE wants to establish an RRC connection for reporting QoE measurement results, and through this, may configure the UE with a necessary SRB (e.g., SRB4) to establish an RRC connection.

Thereafter, the UE may report the QoE measurement results via messages such as RRC Setup Complete/RRC Resume Complete/RRC Reestablishment Complete. In another embodiment of the present disclosure, after completing the connection, other messages described above may be utilized for reporting. As another example, after completing the connection, the base station may transmit a retrieval request, and the UE may perform reporting according to the request.

The UE may use both a method of triggering a report without a retrieval from the base station and a method of triggering a report through a retrieval from the base station.

Conventionally, logged MDT reporting is performed via signaling radio bearer 2 (SRB2), but QoE measurement reporting (LTE) in RRC_CONNECTED mode is performed via SRB4 (the lowest priority SRB). According to an embodiment of the present disclosure, QoE measurement reporting in the RRC_CONNECTED mode may use SRB4 as before, and QoE measurement reporting in the RRC_INACTIVE/RRC_IDLE mode may use SRB2. In another embodiment of the present disclosure, QoE measurement reporting in RRC_CONNECTED/RRC INACTIVE/RRC_IDLE modes may all be performed via SRB4. In another embodiment of the present disclosure, QoE measurement reporting in RRC_CONNECTED/RRC_INACTIVE/RRC_IDLE modes may all be performed via SRB2.

In RRC_INACTIVE/RRC_IDLE mode where the UE is performing QoE measurement, logging, or reporting, the UE may camp on a new base station through mobility. At this time, the UE may decide to perform logging or reporting based on the logged QoE measurement configuration information previously received or logged QoE measurement configuration information (e.g., the area configuration, the plmn-IdentityList, the direct QoE measurement/logging/reporting indicator) transmitted by the new base station. In another embodiment of the present disclosure, the UE may report the Availability information to a new base station, wait for a response (e.g., retrieval or new logged QoE configuration) from the base station, and respond accordingly (determine whether to report).

In the case of RRC mode transition, the UE may reuse some (or all) of the QoE configuration information used before the transition even after the transition. In another embodiment of the present disclosure, the base station may transmit new configuration information to the UE. In the case of a UE mode transition at which previous configuration information is not maintained (e.g., transition from RRC_CONNECTED mode to RRC_IDLE mode, transition from RRC_IDLE mode to RRC_CONNECTED mode), this may not be applied. When the base station transmits new configuration information to the UE (regardless of a change in RRC mode), transmitting only some changed configuration information (delta signaling) is more efficient in using limited radio resources than transmitting all new configuration information. In this case, the UE may maintain the configuration information not provided and update and use only the received new configuration information.

In an embodiment of the present disclosure, messages and fields such as configurations (LoggedMeasurementConfiguration)/reporting (LogMeasReport)/UE variables (VarLogMeasConfig/VarLogMeasReport) that are previously used for logged MDT measurements may be shared in whole or in part for logged QoE measurements. In another embodiment of the present disclosure, the messages or information for logged QoE measurements may be defined/used/stored separately/independently from existing logged MDT measurements.

In LTE, if the UE AS receives measurement results in RRC_CONNECTED mode from the application layer, the UE may report the measurement results to the base station in RRC_CONNECTED mode without a separate logging procedure. On the other hand, according to an embodiment of the present disclosure, a unified framework can be used regardless of an RRC mode by logging measurement results in the RRC_CONNECTED mode. In other words, even in the CONNECTED mode, the measurement results are logged first and then reported to the base station. In this case, the UE may use some or all of the same logged QoE measurement configurations regardless of the RRC mode, and there is no need to separately transmit a configuration message (e.g., measConfigAppLayer) for the RRC_CONNECTED mode only to the UE. All configuration information may not be commonly applied to all RRC modes. In this case, information for each mode may be provided within a single configuration message. Additionally, as the legacy LTE technology, a procedure for logging MBMS Single Frequency Network (MBSFN) measurement results regardless of RRC_IDLE mode/RRC_CONNECTED mode is defined as follows.

In NR, a method of reusing or improving a part of the procedure or the whole procedure to log QoE measurement results regardless of an RRC mode may also be considered.

Figure 1I:
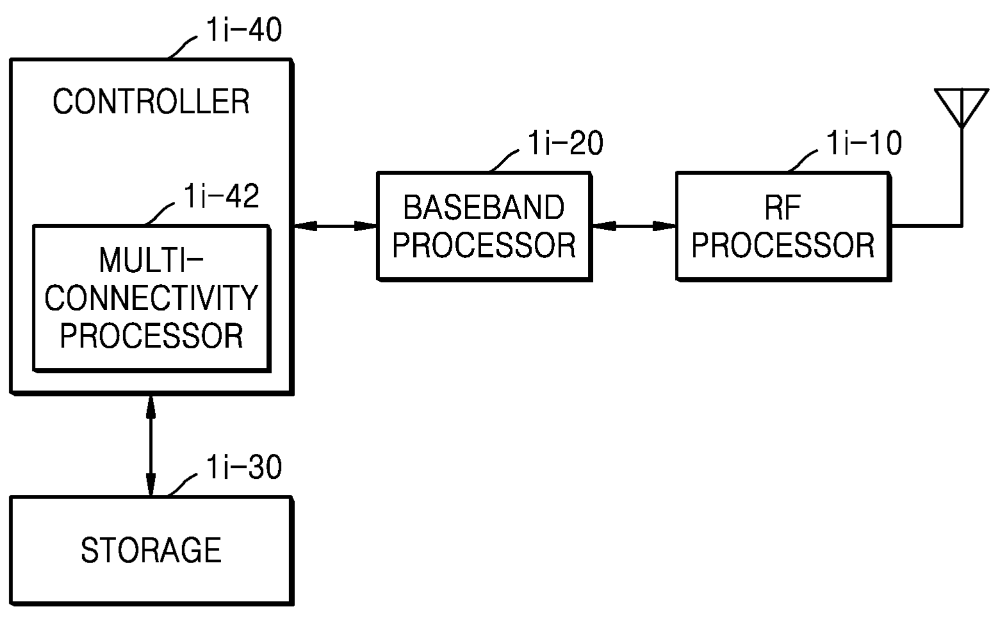
FIG. 1I is a block diagram of an internal structure of a UE according to an embodiment of the present disclosure.

FIG. 1I is a block diagram of an internal structure of a UE according to an embodiment of the present disclosure.

Referring to FIG. 1I, the UE includes a radio frequency (RF) processor 1*i*-10, a baseband processor 1*i*-20, a storage 1*i*-30, and a controller 1*i*-40.

The RF processor 1*i*-10 performs a function for transmitting and receiving a signal via a radio channel, such as signal conversion between bands and amplification. That is, the RF processor 1*i*-10 up-converts a baseband signal provided from the baseband processor 1*i*-20 into an RF signal and transmits the RF signal via an antenna, and down-converts an RF signal received via the antenna into a baseband signal. For example, the RF processor 1*i*-10 may include a transmit filter, a receive filter, an amplifier, a mixer, an oscillator, a digital-to-analog converter (DAC), an analog-to-digital converter (ADC), etc. Although only one antenna is illustrated in FIG. 1I, the UE may include multiple antennas. The RF processor 1*i*-10 may also include multiple RF chains. Furthermore, the RF processor 1*i*-10 may perform beamforming. For the beamforming, the RF processor 1*i*-10 may adjust a phase and a magnitude of each of the signals transmitted and received through multiple antennas or antenna elements. Also, the RF processor may perform multiple-input multiple-output (MIMO), and receive multiple layers when performing the MIMO operation.

The baseband processor 1*i*-20 performs a function for conversion between a baseband signal and a bit string according to a physical layer standard of the system. For example, when transmitting data, the baseband processor 1*i*-20 generates complex symbols by encoding and modulating a transmission bit string. Furthermore, when receiving data, the baseband processor 1*i*-20 reconstructs a reception bit string by demodulating and decoding a baseband signal from the RF processor 1*i*-10. For example, according to an OFDM scheme, when transmitting data, the baseband processor 1*i*-20 generates complex symbols by encoding and modulating a transmission bit string, maps the complex symbols to subcarriers, and then produces OFDM symbols through inverse fast Fourier transform (IFFT) operations and cyclic prefix (CP) insertion. Furthermore, when receiving data, the baseband processor 1*i*-20 divides the baseband signal from the RF processor 1*i*-10 into OFDM symbols, recovers signals mapped to subcarriers through FFT operations, and then reconstructs a reception bit string through demodulation and decoding.

The baseband processor 1*i*-20 and the RF processor 1*i*-10 transmit and receive signals as described above. Thus, the baseband processor 1*i*-20 and the RF processor 1*i*-10 may be referred to as a transmitter, receiver, transceiver, or communication unit. Furthermore, at least one of the baseband processor 1*i*-20 and the RF processor 1*i*-10 may include multiple communication modules to support multiple different RATs. In addition, at least one of the baseband processor 1*i*-20 and the RF processor 1*i*-10 may include different communication modules to process signals in different frequency bands. For example, the different RATs may include a wireless local area network (WLAN) technology (e.g., Institute of Electrical and Electronics Engineers (IEEE) 802.11), a cellular network technology (e.g., LTE), etc. Furthermore, the different frequency bands may include super-high frequency (SHF) bands (e.g., 2.5 GHz and 5 GHz) and millimeter wave (mmWave) bands (e.g., 60 GHz).

The storage 1*i*-30 stores basic programs, application programs, and data such as configuration information for operations of the UE. In particular, the storage 1*i*-30 may store information related to a second access node that performs wireless communication using a second RAT. The storage 1*i*-30 also provides stored data according to a request from the controller 1*i*-40.

The controller 1*i*-40 controls all operations of the UE. For example, the controller 1*i*-40 transmits and receives signals via the baseband processor 1*i*-20 and the RF processor 1*i*-10. The controller 1*i*-40 also writes and reads data to and from the storage 1*i*-30. To achieve this, the controller 1*i*-40 may include at least one processor. For example, the controller 1*i*-40 may include a communication processor (CP) for performing control for communication and an application processor (AP) for controlling upper layers such as application programs.

Figure 1J:
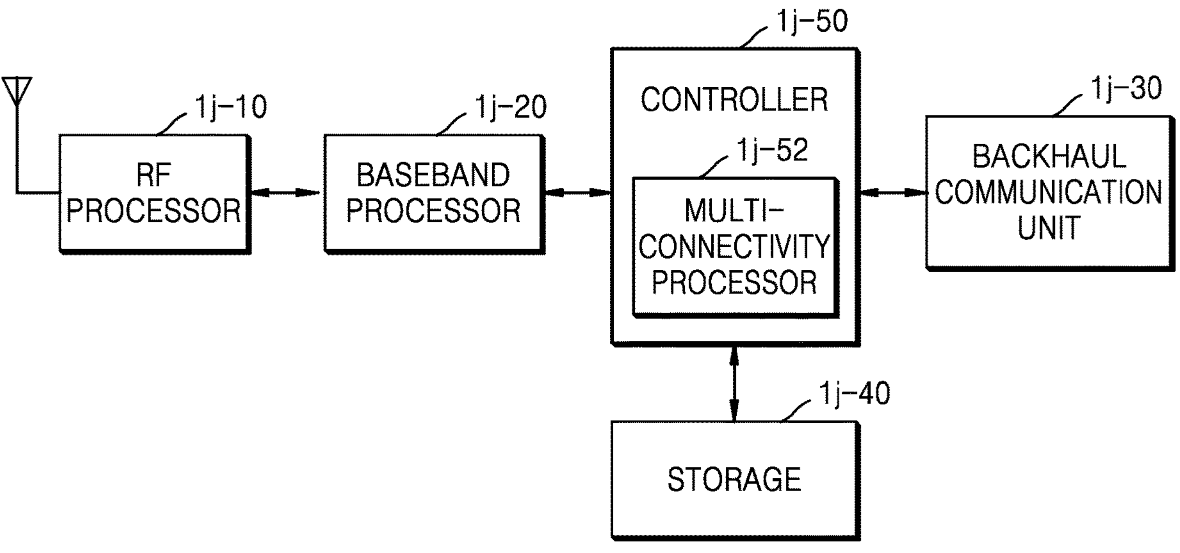
FIG. 1J is a block diagram of a configuration of a base station according to an embodiment of the present disclosure.

FIG. 1J is a block diagram of a configuration of a base station according to an embodiment of the present disclosure.

As illustrated in FIG. 1J, the base station includes an RF processor 1*j*-10, a baseband processor 1*j*-20, a backhaul communication unit 1*j*-30, a storage 1*j*-40, and a controller 1*j*-50.

The RF processor 1*j*-10 performs a function for transmitting and receiving a signal via a radio channel, such as signal conversion between bands and amplification. That is, the RF processor 1*j*-10 up-converts a baseband signal from the baseband processor 1*j*-20 into an RF signal and transmits the RF signal via an antenna, and down-converts an RF signal received via the antenna into a baseband signal. For example, the RF processor 1*j*-10 may include a transmit filter, a receive filter, an amplifier, a mixer, an oscillator, a DAC, an ADC, etc. Although only one antenna is shown in FIG. 1J, the base station may include multiple antennas. Also, the RF processor 1*j*-10 may include multiple RF chains. Furthermore, the RF processor 1*j*-10 may perform beamforming. For the beamforming, the RF processor 1*j*-10 may adjust a phase and magnitude of each of the signals transmitted and received through multiple antennas or antenna elements. The RF processor 1*j*-10 may perform an MIMO DL operation by transmitting one or more layers.

The baseband processor 1*j*-20 performs a function for conversion between a baseband signal and a bit string according to a physical layer standard of a first RAT. For example, when transmitting data, the baseband processor 1*j*-20 generates complex symbols by encoding and modulating a transmission bit string. Furthermore, when receiving data, the baseband processor 1*j*-20 reconstructs a reception bit string by demodulating and decoding a baseband signal from the RF processor 1*j*-10. For example, according to an OFDM scheme, when transmitting data, the baseband processor 1*j*-20 generates complex symbols by encoding and modulating a transmission bit string, maps the complex symbols to subcarriers, and then produces OFDM symbols through IFFT operations and CP insertion. Furthermore, when receiving data, the baseband processor 1*j*-20 divides the baseband signal from the RF processor 1*j*-10 into OFDM symbols, recovers signals mapped to subcarriers through FFT operations, and then reconstructs a reception bit string through demodulation and decoding. The baseband processor **1*j*-20 and the RF processor 1*j*-10 transmit and receive signals as described above. Accordingly, the baseband processor 1*j*-20 and the RF processor 1*j*-10** may be referred to as a transmitter, receiver, transceiver, or communication unit.

The backhaul communication unit **1*j*-30 provides an interface to communicate with other nodes in a network. That is, the backhaul communication unit 1*j*-30** converts a bit string to be transmitted from a primary base station to another node, such as an auxiliary base station, a CN, or the like, into a physical signal, and converts a physical signal received from the other node into a bit string.

The storage **1*j*-40 stores basic programs, application programs, and data such as configuration information for operations of the primary base station. In particular, the storage 1*j*-40 may store information about bearers allocated to a connected UE, measurement results reported by the connected UE, etc. Furthermore, the storage 1*j*-40 may store information that is a criterion for determining whether to provide or terminate multiple connectivity to or from the UE. The storage 1*j*-40 also provides stored data according to a request from the controller 1*j*-50**.

The controller **1*j*-50 controls all operations of the primary base station. For example, the controller 1*j*-50 transmits and receives signals through the baseband processor 1*j*-20 and the RF processor 1*j*-10 or through the backhaul communication unit 1*j*-30. The controller 1*j*-50 also writes and reads data to and from the storage 1*j*-40. To achieve this, the controller 1*j*-50** may include at least one processor.

Figure 2:
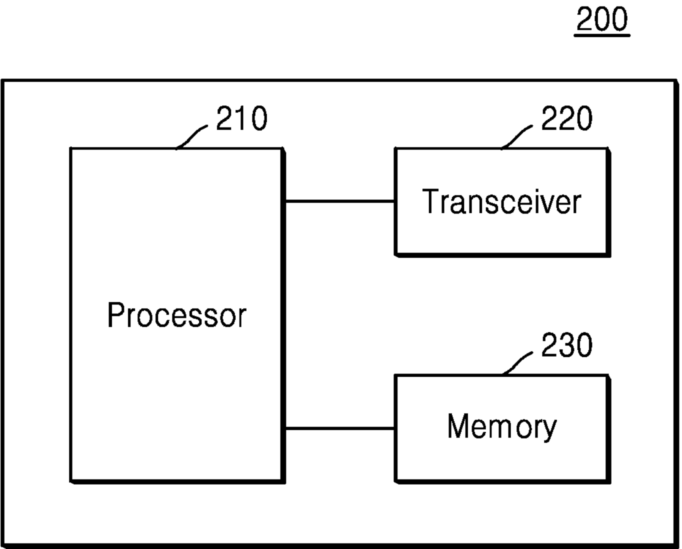
FIG. 2 is a diagram for describing a UE according to an example embodiment of the present disclosure.

FIG. 2 is a diagram for describing a UE according to an example embodiment of the present disclosure.

A UE 200 may include a processor 210, a transceiver 220, and a memory 230. However, because all of the illustrated components are not essential, the UE 200 may be implemented with more or fewer components than illustrated. Furthermore, in some cases, the processor 210, the transceiver 220, and the memory 230 may be implemented as a single chip.

The processor 210 may include one or more processors or other processing devices that control the disclosed functions, processes and/or methods. Operations of the UE 200 may be implemented by the processor 210.

The transceiver 220 may include an RF transmitter for up-converting and amplifying a frequency of a signal to be transmitted and an RF receiver for down-converting a frequency of a received signal. However, according to another embodiment, the transceiver 220 may be implemented with more or fewer components than described above.

The transceiver 220 may be coupled to the processor 210 to transmit and/or receive signals. The signals may include control information and data. Also, the transceiver 220 may receive a signal via a radio channel and output the received signal to the processor 210. The transceiver 220 may transmit a signal output from the processor 210 via a radio channel.

The memory 230 may store control information or data included in a signal obtained by the UE 200. The memory 230 may be coupled to the processor 210 and store at least one instruction or protocol or parameter for the disclosed functions, processes and/or methods. The memory 230 may include read-only memory (ROM) and/or random access memory (RAM) and/or hard disk and/or compact disc (CD)-ROM and/or digital video discs (DVDs) and/or other storage devices.

Figure 3:
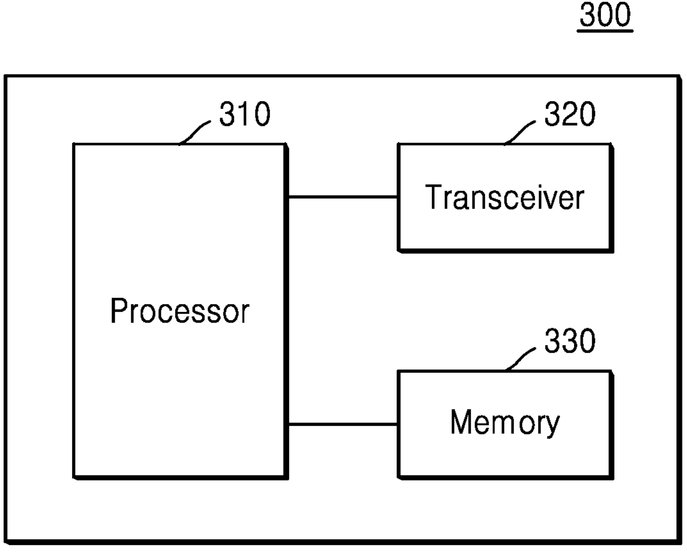
FIG. 3 is a diagram for describing a base station according to an example embodiment of the present disclosure.

FIG. 3 is a diagram for describing a base station according to an example embodiment of the present disclosure.

A base station 300 may include a processor 310, a transceiver 320, and a memory 330. However, because all of the illustrated components are not essential, the base station 300 may be implemented with more or fewer components than illustrated. Furthermore, in some cases, the processor 310, the transceiver 320, and the memory 330 may be implemented as a single chip.

The processor 310 may include one or more processors or other processing devices that control the disclosed functions, processes and/or methods. Operations of the base station 300 may be implemented by the processor 310.

The transceiver 320 may include an RF transmitter for up-converting and amplifying a frequency of a signal to be transmitted and an RF receiver for down-converting a frequency of a received signal. However, according to another embodiment, the transceiver 320 may be implemented with more or fewer components than described above.

The transceiver 320 may be coupled to the processor 310 to transmit and/or receive signals. The signals may include control information and data. Also, the transceiver 320 may receive a signal via a radio channel and output the received signal to the processor 310. The transceiver 320 may transmit a signal output from the processor 310 via a radio channel.

The memory 330 may store control information or data included in a signal obtained by the base station 300. The memory 330 may be coupled to the processor 310 and store at least one instruction or protocol or parameter for the disclosed functions, processes and/or methods. The memory 330 may include ROM and/or RAM and/or hard disk and/or CD-ROM and/or DVDs and/or other storage devices.

Methods according to embodiments of the present disclosure described in the appended claims or specification thereof may be implemented in hardware, software, or a combination of hardware and software.

When the methods are implemented in software, a computer-readable storage medium having at least one program (software module) stored therein may be provided. The at least one program stored in the computer-readable storage medium is configured for execution by at least one processor within an electronic device. The at least one program includes instructions that cause the electronic device to execute the methods according to the embodiments of the present disclosure described in the claims or specification thereof.

The program (software module or software) may be stored in RAM, non-volatile memory including a flash memory, ROM, electrically erasable programmable ROM (EEPROM), magnetic disc storage devices, CD-ROM, DVDs or other types of optical storage devices, and magnetic cassettes. Alternatively, the program may be stored in a memory that is configured as a combination of some or all of the stated devices. A plurality of such devices may be included in the memory.

Furthermore, the program may be stored in an attachable storage device that may be accessed through communication networks, such as the Internet, Intranet, a LAN, a WLAN, and a storage area network (SAN), or a communication network configured in a combination thereof. The storage device may connect to a device for performing a method according to an embodiment of the present disclosure via an external port. Furthermore, a separate storage device on a communication network may also connect to a device for performing a method according to an embodiment of the present disclosure.

The term "computer program product" or "computer-readable medium" as used herein is used to collectively refer to a medium such as memory, a hard disk installed in a hard disk drive, and signals. The "computer program product" or "computer-readable medium" is a means provided to a software computer system including instructions for configuring a length of a timer for receiving missing data packets, based on a network metric corresponding to a determined event according to the present disclosure.

In the specific embodiments of the present disclosure described above, a component included in the present disclosure is expressed in a singular or plural form depending on the presented specific embodiments. However, singular or plural expressions are selected to be suitable for the presented situations for convenience of descriptions, and the present disclosure is not limited to elements in a singular or plural form, i.e., an element expressed in a plural form may be configured as a single element, or an element expressed in a singular form may be configured as a plurality of elements.

Moreover, although specific embodiments have been described in the detailed description of the present disclosure, various modifications may be made therein without departing from the scope of the present disclosure. Thus, the scope of the present disclosure should not be limited to the described embodiments but be defined by the following claims as well as their equivalents.

The invention claimed is:

1. A method, performed by a user equipment (UE), of managing quality of experience (QoE) in a wireless communication system, the method comprising:

establishing a radio resource control (RRC) connection with a base station;

transmitting UE capability information related to logged QoE measurement to the base station;

receiving, from the base station, logged QoE measurement configuration information;

logging QoE measurement results, based on the received logged QoE measurement configuration information;

receiving a QoE data retrieval request from the base station; and transmitting logged QoE measurement result data to the base station in response to receiving the QoE data retrieval request, wherein the method further comprises:

camping on a new base station, receiving new logged QoE measurement configuration information from the new base station, and determining whether to perform logging or reporting based on the logged QoE measurement configuration information and the new logged QoE measurement configuration information.

2. The method of claim 1, wherein the UE is in an RRC INACTIVE mode or an RRC IDLE mode before the establishing of the RRC connection with the base station.

3. The method of claim 1, wherein the UE capability information comprises information indicating a capability for logged QoE measurement by the UE.

4. The method of claim 1, wherein the logged QoE measurement configuration information comprises at least one of trace reference information, trace collection entity (TCE) identifier (ID) information, area configuration, or logged QoE PLMN list information.

5. The method of claim 4, wherein the logged QoE measurement result data includes at least one of the trace reference information or TCE ID information.

6. The method of claim 1, wherein the logged QoE measurement configuration information is received from the base station via an RRC reconfiguration message.

7. The method of claim 1, further comprising:

reestablishing the RRC connection with the base station, and reporting an availability of logged QoE data to the base station via RRC reestablishment complete message, RRC reconfiguration complete message, RRC resume complete message, or RRC setup complete message.

8. The method of claim 1, further comprising, before the receiving of the QoE data retrieval request from the base station, transmitting availability of logged QoE measurement results to the base station.

9. A user equipment (UE) for managing quality of experience (QoE) in a wireless communication system, the UE comprising:

a transceiver; and a processor coupled to the transceiver and configured to:

establish a radio resource control (RRC) connection with a base station, transmit, via the transceiver, UE capability information related to logged QoE measurement to the base station, receive, via the transceiver, from the base station, logged QoE measurement configuration information including at least one of trace reference information, trace collection entity (TCE) identifier (ID) information, area configuration, or logged QoE PLMN list information, log QoE measurement results based on the received logged QoE measurement configuration information, transmit, via the transceiver, availability of logged QoE measurement results to the base station, receive, via the transceiver, a QoE data retrieval request from the base station, and transmit, via the transceiver, logged QoE measurement result data to the base station, wherein the processor is further configured to:

camp on a new base station, receive new logged QoE measurement configuration information from the new base station, and determine whether to perform logging or reporting based on the logged QoE measurement configuration information and the new logged QoE measurement configuration information.

* * * * *